United States Patent
Hebron et al.

(10) Patent No.: US 12,445,247 B2
(45) Date of Patent: Oct. 14, 2025

(54) CHANNEL ACQUISITION USING ORTHOGONAL TIME FREQUENCY SPACE MODULATED PILOT SIGNALS

(71) Applicant: Cohere Technologies, Inc., San Jose, CA (US)

(72) Inventors: Yoav Hebron, San Jose, CA (US); Shlomo Selim Rakib, San Jose, CA (US); Ronny Hadani, San Jose, CA (US); Michail Tsatsanis, San Jose, CA (US); Clayton Ambrose, San Jose, CA (US); Jim Delfeld, San Jose, CA (US); Robert Fanfelle, San Jose, CA (US)

(73) Assignee: Cohere Technology, Inc., San Jose, CA (US)

( * ) Notice: Subject to any disclaimer, the term of this patent is extended or adjusted under 35 U.S.C. 154(b) by 0 days.

(21) Appl. No.: 18/628,558

(22) Filed: Apr. 5, 2024

(65) Prior Publication Data
US 2024/0348389 A1 Oct. 17, 2024

Related U.S. Application Data

(63) Continuation of application No. 17/805,569, filed on Jun. 6, 2022, now Pat. No. 11,968,144, which is a (Continued)

(51) Int. Cl.
*H04L 5/00* (2006.01)
*H04B 7/005* (2006.01)
(Continued)

(52) U.S. Cl.
CPC .......... *H04L 5/0048* (2013.01); *H04B 7/005* (2013.01); *H04B 17/309* (2015.01); *H04B 17/373* (2015.01); *H04L 5/0007* (2013.01); *H04L 5/0044* (2013.01); *H04L 25/0202* (2013.01); *H04L 25/0204* (2013.01); *H04L 25/0226* (2013.01); *H04L 25/0232* (2013.01);
(Continued)

(58) Field of Classification Search
CPC ... H04L 5/0048; H04L 5/0007; H04L 5/0044; H04L 25/0202; H04L 25/0204; H04L 25/0226; H04L 25/0232; H04L 27/01; H04L 27/2639; H04L 27/2647; H04L 25/0224; H04L 25/0256; H04L 25/0258; H04B 7/005; H04B 17/309; H04B 17/373
See application file for complete search history.

(56) References Cited

U.S. PATENT DOCUMENTS 10,666,314 B2 * 5/2020 Hadani .................. H04B 1/707
10,666,479 B2 * 5/2020 Hadani .................. H04B 7/01
(Continued)

*Primary Examiner* — Jay P Patel
(74) *Attorney, Agent, or Firm* — Perkins Coie LLP

(57) ABSTRACT

Techniques for performing channel estimation in an orthogonal time, frequency and space (OTFS) communication system include receiving a wireless signal comprising a data signal portion and a pilot signal portion in which the pilot signal portion includes multiple pilot signals multiplexed together in the OTFS domain, performing two-dimensional channel estimation in a time-frequency domain based on a minimum mean square error (MMSE) optimization criterion, and recovering information bits using a channel estimate obtained from the two-dimensional channel estimation.

20 Claims, 27 Drawing Sheets

Related U.S. Application Data continuation of application No. 16/947,799, filed on Aug. 17, 2020, now Pat. No. 11,362,786, which is a continuation of application No. 16/143,193, filed on Sep. 26, 2018, now Pat. No. 10,749,651, which is a continuation of application No. PCT/US2017/025166, filed on Mar. 30, 2017.

(60) Provisional application No. 62/316,437, filed on Mar. 31, 2016.

(51) Int. Cl.
  *H04B 17/309* (2015.01)
  *H04B 17/373* (2015.01)
  *H04L 25/02* (2006.01)
  *H04L 27/01* (2006.01)
  *H04L 27/26* (2006.01)

(52) U.S. Cl.
  CPC .......... *H04L 27/01* (2013.01); *H04L 27/2639* (2013.01); *H04L 27/2647* (2013.01)

(56) References Cited

U.S. PATENT DOCUMENTS

| | | | |
|---|---|---|---|
| 2017/0012749 A1* | 1/2017 | Rakib | H04L 27/2639 |
| 2017/0099122 A1* | 4/2017 | Hadani | H04L 5/0005 |
| 2017/0099607 A1* | 4/2017 | Hadani | H04L 27/3488 |
| 2017/0149594 A1* | 5/2017 | Rakib | H04L 5/0007 |
| 2018/0227159 A1* | 8/2018 | Rakib | H04L 27/2646 |
| 2019/0342136 A1* | 11/2019 | Hadani | H04L 27/2639 |
| 2019/0379422 A1* | 12/2019 | Hadani | H04L 5/006 |

* cited by examiner

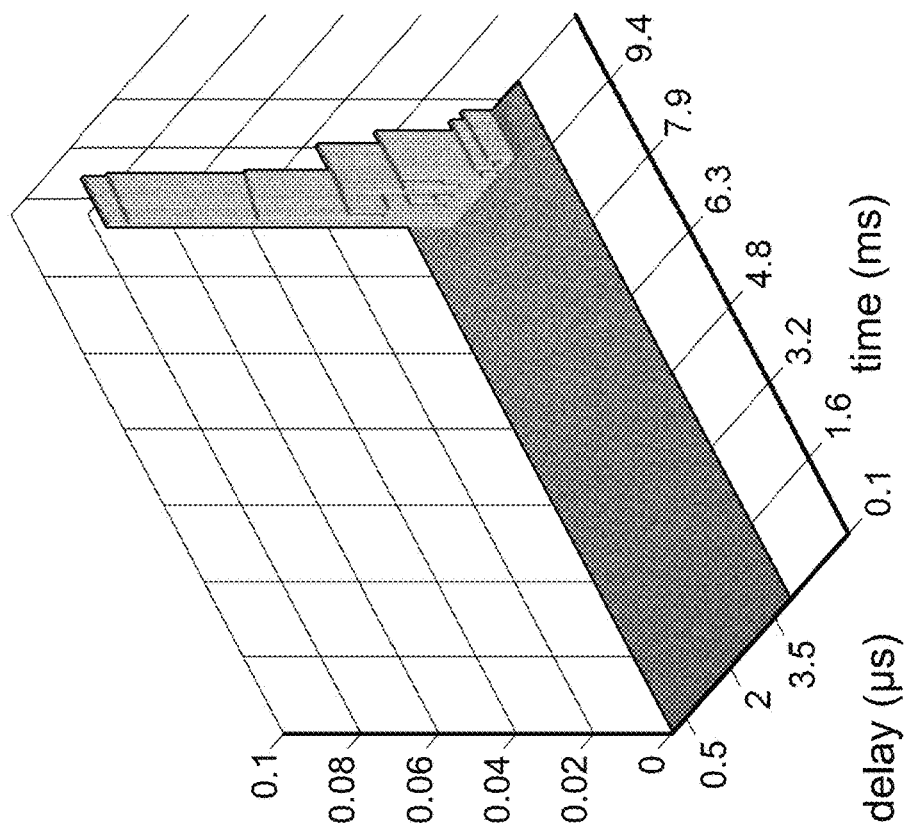
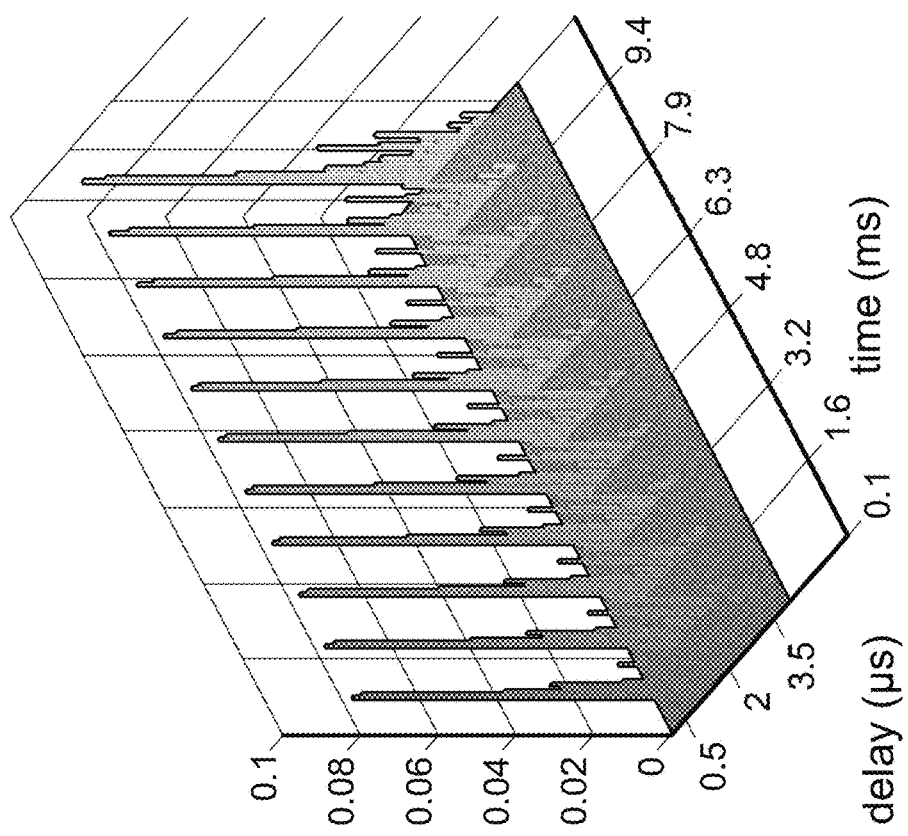
FIG. 10

CHANNEL ACQUISITION USING ORTHOGONAL TIME FREQUENCY SPACE MODULATED PILOT SIGNALS

CROSS-REFERENCE TO RELATED APPLICATIONS

This patent document is a continuation of U.S. application Ser. No. 17/805,569, filed Jun. 6, 2022, which is a continuation of U.S. application Ser. No. 16/947,799, entitled "CHANNEL ACQUISITION USING ORTHOGONAL TIME FREQUENCY SPACE MODULATED PILOT SIGNALS" filed Aug. 17, 2020, now U.S. Pat. No. 11,362,786, issued Jun. 13, 2022, which is a continuation of U.S. application Ser. No. 16/143,193, entitled "CHANNEL ACQUISITION USING ORTHOGONAL TIME FREQUENCY SPACE MODULATED PILOT SIGNALS" filed Sep. 26, 2018, now U.S. Pat. No. 10,749,651, issued on Aug. 18, 2020, which is a continuation of PCT Application No. PCT/US2017/025166, entitled "CHANNEL ACQUISITION USING ORTHOGONAL TIME FREQUENCY SPACE MODULATED PILOT SIGNALS" filed on Mar. 30, 2017, which claims priority to U.S. Provisional Application Ser. No. 62/316,437, entitled "CHANNEL ACQUISITION USING ORTHOGONAL TIME FREQUENCY SPACE MODULATED PILOT SIGNALS" filed on Mar. 31, 2016. The entire content of the aforementioned patent applications is incorporated by reference herein.

TECHNICAL FIELD

The present document relates to wireless communication, and more particularly, to receiver-side processing of orthogonal time frequency space (OTFS) domain modulated signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses receiver-side techniques for performing channel estimation, or channel acquisition, from received signals that include OTFS pilot signals.

In one example aspect, a wireless communication method for recovering information bits from a received signal, implemented by a wireless communication receiver is disclosed. The method includes receiving a wireless signal comprising a data signal portion and a pilot signal portion wherein the pilot signal portion includes multiple pilot signals multiplexed together in an orthogonal time frequency space (OTFS) domain, performing two-dimensional channel estimation in a time-frequency domain based on a minimum mean square error (MMSE) optimization criterion, and recovering information bits using a channel estimate obtained from the two-dimensional channel estimation.

In another example aspect, a technique for recovering information bits from a received signal, implemented by a wireless communication receiver is disclosed. The technique includes receiving, over a communication channel. a wireless signal comprising a data signal portion and a pilot signal portion wherein the pilot signal portion includes multiple pilot signals multiplexed together in an orthogonal time frequency space (OTFS) domain, transforming the received wireless signal into a delay-time domain signal, applying a delay-time domain mask to separate out each of the multiple pilot signal's contribution to the delay-time domain signal into corresponding separate received pilot signal contributions, estimating, using the separate received pilot signal contributions, the communication channel estimates at delay-time domain positions of the multiple pilot signals, and interpolating the communication channel estimates to obtain an entire communication channel estimate.

In yet another aspect, a wireless communication method for recovering information bits from a received signal, implemented by a wireless communication receiver is disclosed. The method includes receiving, over a communication channel. a wireless signal comprising a data signal portion and a pilot signal portion wherein the pilot signal portion includes multiple pilot signals multiplexed together in an orthogonal time frequency space (OTFS) domain, transforming the received wireless signal into a delay-Doppler domain signal by applying a two-dimensional symplectic Fourier transform, applying a delay-Doppler domain mask to separate out each of the multiple pilot signal's contribution to the time-frequency domain signal into corresponding separate received pilot signal contributions, estimating, using the separate received pilot signal contributions, the communication channel estimates at delay-Doppler domain positions of the multiple pilot signals, and interpolating the communication channel estimates to obtain an entire communication channel estimate.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 10 is a graph showing an example interpolation problem. Left: channel response measured on the pilot sub-lattice. Right: desired channel response.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

The present-day wireless technologies are expected to fall short in meeting the rising demand in wireless communications. Many industry organizations have started the efforts to standardize next generation of wireless signal interoperability standards. The 5th Generation (5G) effort by the 3rd Generation Partnership Project (3GPP) is one such example and is used throughout the document for the sake of explanation. The disclosed technique could be, however, used in other wireless networks and systems.

Section headings are used in the present document to improve readability of the description and do not in any way limit the discussion to the respective sections only.

Figure 1:
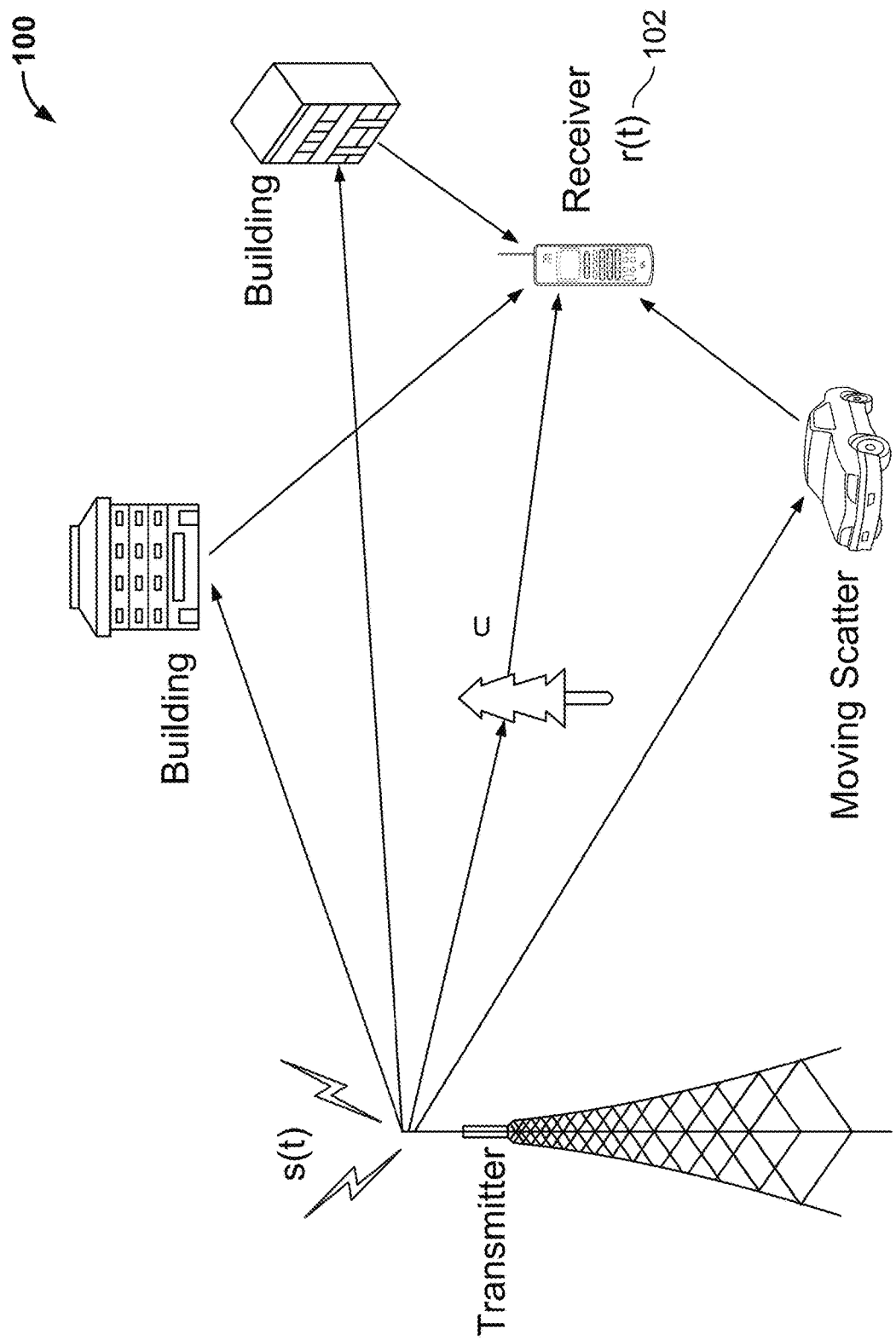
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102.

As explained herein, channel acquisition, or channel estimation, of wireless signals that include OTFS pilots and data, may be performed in different ways. In some embodiments, OTFS pilot signals may, for example, be in the form of OTFS domain impulses.

1. INTRODUCTION

This document discloses different channel acquisition mechanisms using OTFS-based pilots. The theory and implementation of OTFS-based pilots is described in [1]. This document focuses on the description of multiple different ways of estimating the channel using these pilots.

2. CHANNEL ACQUISITION

In the paradigm of OTFS channels are understood in two domains:
Time-Frequency domain. In this domain the channel acts by multiplication and looks like a linear combination of two dimensional waves.
Delay-Doppler domain. In this domain the channel acts by convolution and looks like a linear combination of two dimensional sincs.

The two channel domains are related by the symplectic Fourier transform.

The channel acquisition process incorporates pilot separation, channel interpolation, and/or channel prediction. The following sections will show different ways that the channel acquisition can be performed in different domains including a hybrid domain.

Figure 2:
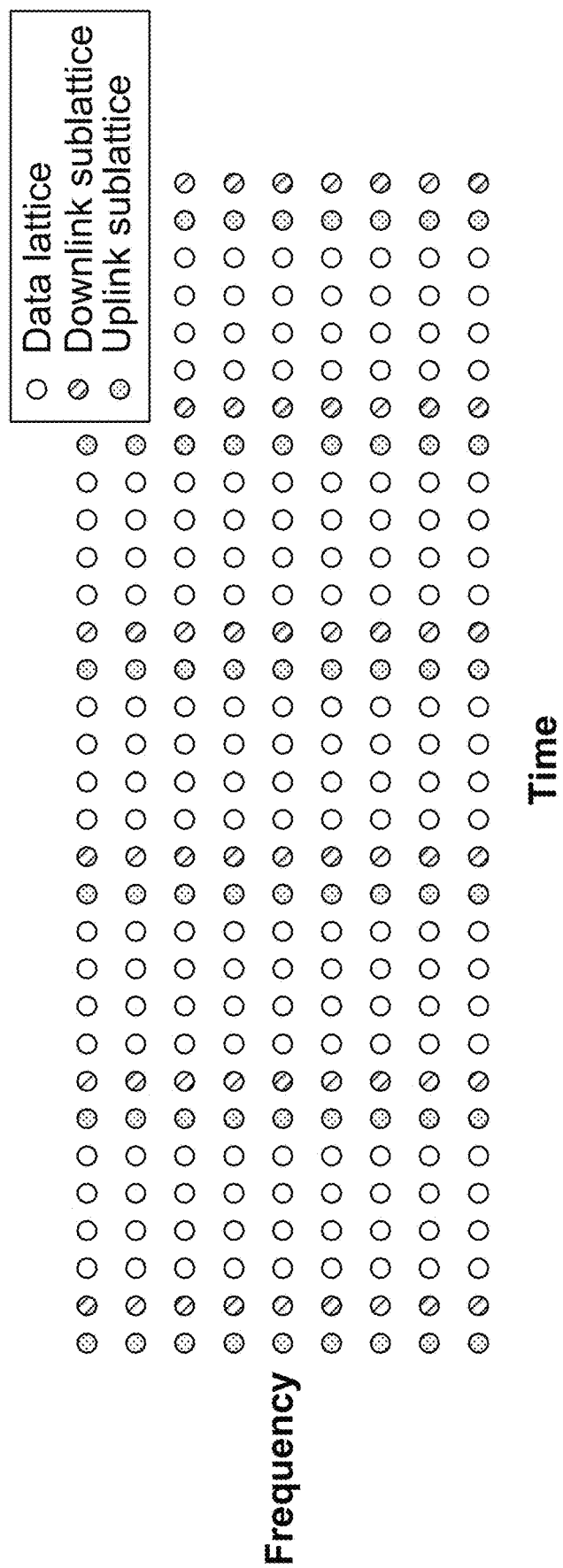
FIG. 2 is a graph showing an example decomposition of the Time-Frequency lattice into three pieces.

For the purpose of this document we assume that the Time-Frequency lattice is partitioned into two or more pieces. A fine lattice used for data transmission, and one or more coarse sub-lattices used for channel acquisition (pilot transmissions). FIG. 2 shows an example of a data lattice with two channel acquisition sub-lattices, one for the downlink and one for the uplink channel acquisitions.

Figure 3:
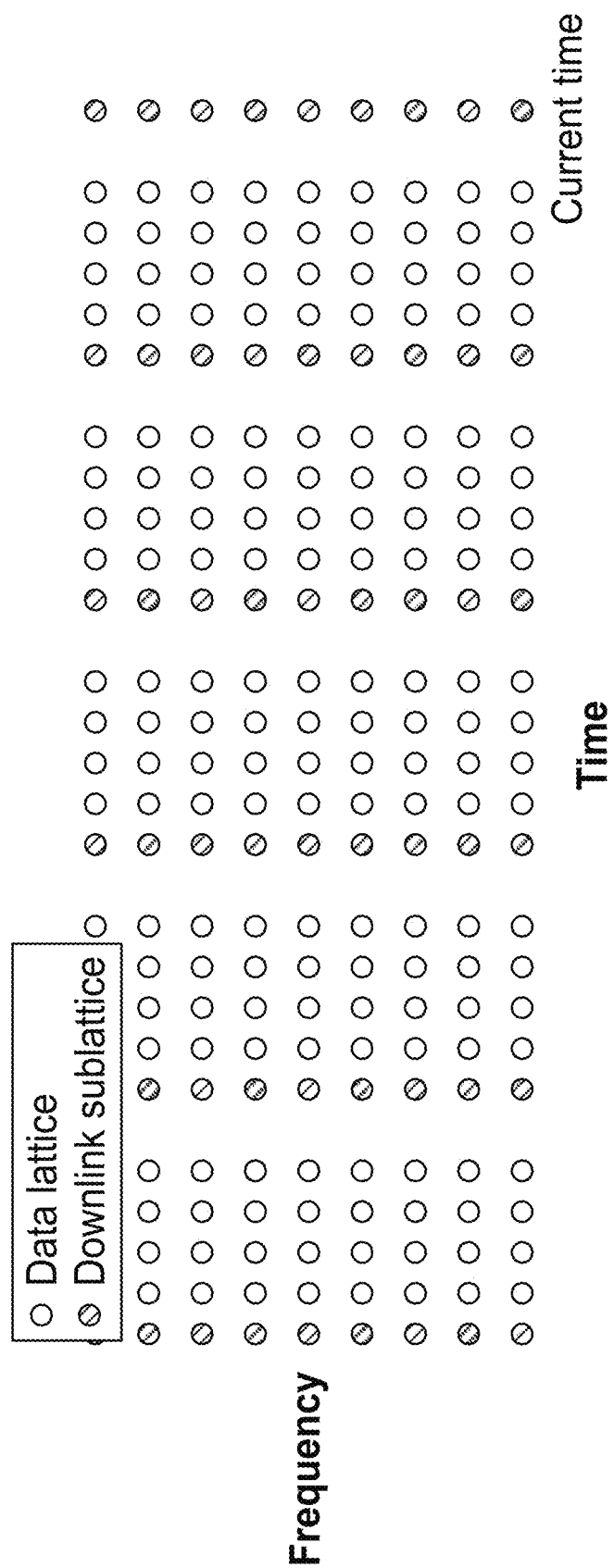
FIG. 3 is a graph showing example of an interpolation problem. After receiving distorted pilots on the downlink channel sub-lattice the remote estimates the channel on a past portion of the data lattice.
Figure 4:
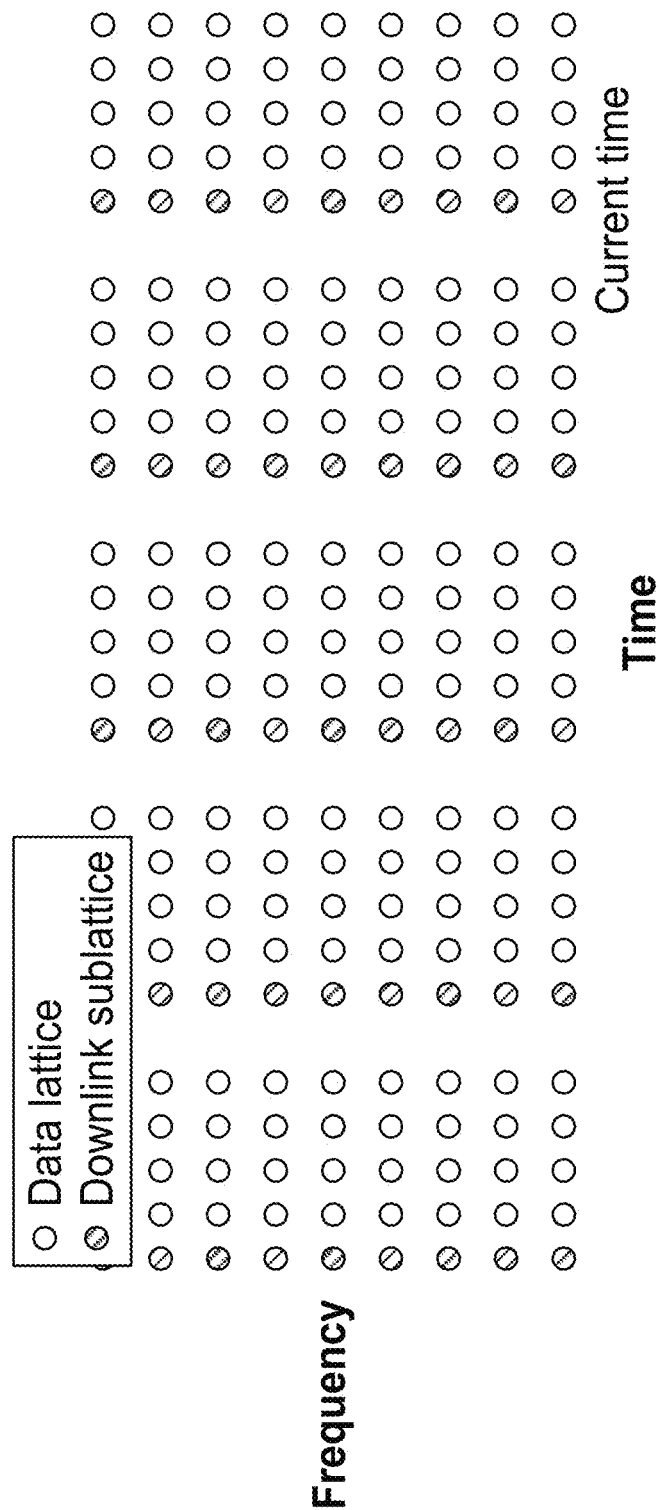
FIG. 4 is a graph showing an example of a Prediction problem. The remote estimates the channel on a future portion of the data lattice.

On the downlink sub-lattice the signal received by the remote's antennas is a linear combination of pilots transmitted by the hub's antennas distorted by the channel. The goal is for the remote to use this received signal to estimate the channel on some portion of the data lattice (for the remainder of the document we focus on the downlink as the problem is symmetric for the uplink). Channel acquisition can be separated into two problems: interpolation and prediction which are summarized in FIG. 3 and FIG. 4.

Channel interpolation is a much easier problem and is sufficient for receive equalizers. However, for transmit equalizers channel prediction is required.

3. TIME-FREQUENCY DOMAIN CHANNEL ACQUISITION

The channel acquisition methods described in this section utilize the Time-Frequency domain, and it can be applied to both pilot separation and channel interpolation and/or prediction.

One method is 2-D MMSE channel acquisition. The theory and mathematical formulas for implementing the 2-D MMSE channel acquisition is described in this document. One way is by performing the following operations:

(1) Generate the square autocorrelation matrix of the pilot for which the channel is being acquired $R_x$. The size of this matrix is $N \cdot M \times N \cdot M$ where $N \Delta t \times N \Delta f$ is the size of the observation domain.

(2) Calculate the cross-correlation matrix $R_{xy}$ by restricting $R_x$ as follows $R_{xy} = Rx \cdot RES^H$. The size of this matrix is $N \cdot M \times P$ where P is the number of pilot samples in the observation window.

(3) Calculate $R_y = RES \cdot Rx \cdot RES^H + R_W = RES \cdot Rxy + R_W$. This matrix is of size $P \times P$.

(4) Calculate $C = R_{xy} \cdot R_y^{-1}$. The size of this matrix is $N \cdot M \times P$ (5) Calculate the estimated pilot signal vector as $C \cdot Y$, and reshape the vector into a matrix of size $N \cdot M$ to form the estimated pilot samples matrix $\hat{X}$ of size $N \times M$ on the Time-Frequency lattice $\wedge$.

(6) Calculate the channel estimate $Ch = \overline{X} \cdot \hat{X}$ where $\overline{X}$ represents taking the conjugate of each element of X, and $\cdot$ represents element by element multiplication. The size of this matrix is $N \times M$ (7) Pick the portion of Ch that represents the Time-Frequency portion for which the channel acquisition is required.

A more optimal way of getting the same result is to calculate the minimum size matrices in every step required to get to the required portion of Ch. The following is an example of such simplification:

(1) Calculate $R_{xy}$ directly only calculating the elements of the restricted $R_x$ only for the portion of the channel that needs to be acquired. E.g. if only L<N time samples of the channel are needed (for either interpolation or prediction beyond the last pilot sample), then the size of this matrix will be $L \cdot M \times P$.

(2) Calculate $R_y$ directly only calculating the elements of the doubly restricted $R_x$.

(3) Calculate $C = R_{xy} \cdot R_y^{-1}$. The size of this matrix will now be $L \cdot M \times P$ (4) Calculate the estimated pilot signal vector as $C \cdot Y$, and reshape the vector into a matrix of size $L \cdot M$ to form the estimated pilot samples matrix $\hat{X}$ of size $L \times M$ on the Time-Frequency lattice $\wedge$.

(5) Calculate the channel estimate $Ch = \overline{X} \cdot \hat{X}$ where $\overline{X}$ represents taking the conjugate of each element of X, and $\cdot$ represents element by element multiplication. The size of this matrix is $L \times M$, and it represents the Time-Frequency portion for which the channel acquisition is performed.

4. HYBRID DELAY TIME DOMAIN CHANNEL ACQUISITION

Figure 5:
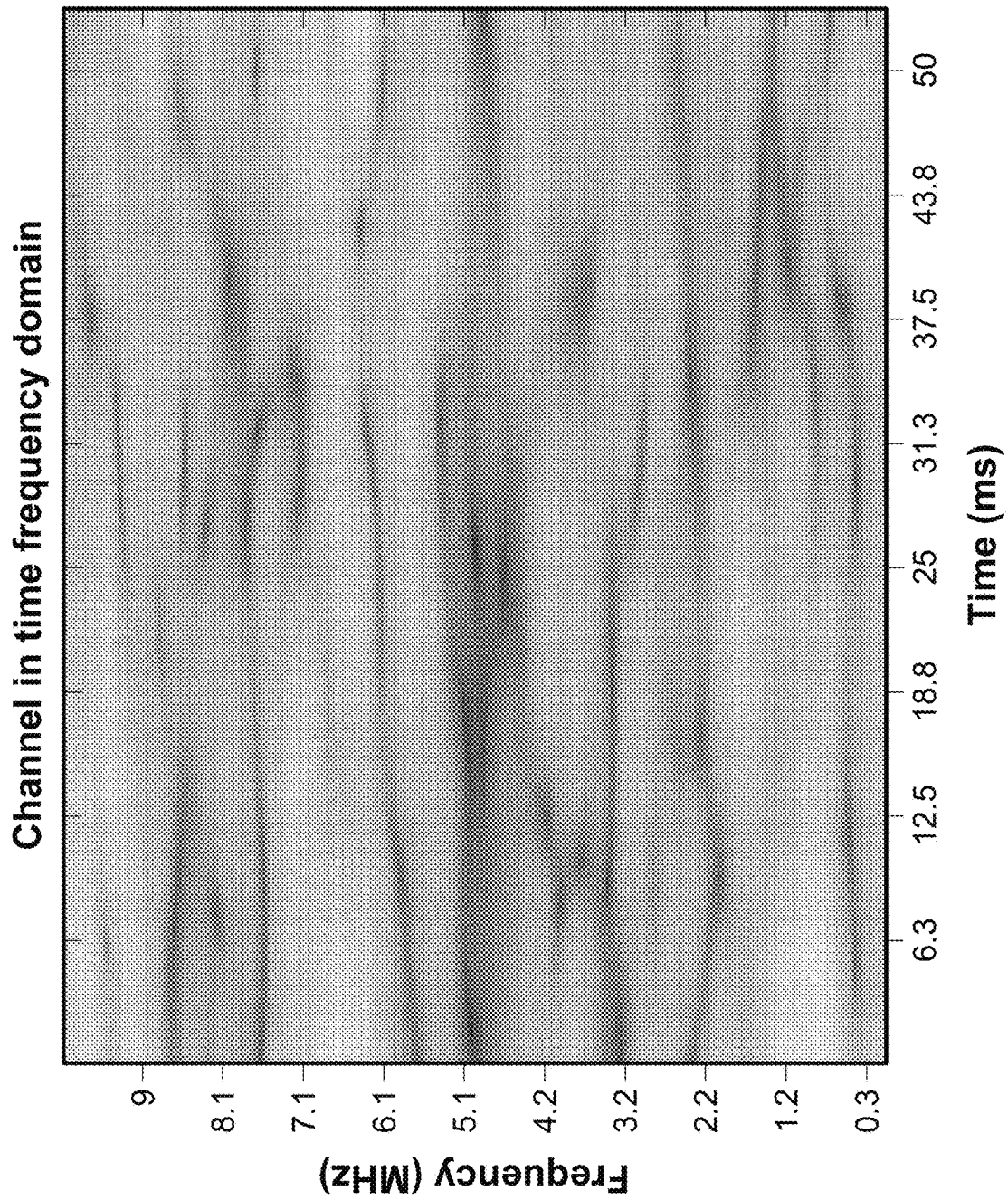
FIG. 5 is a graph showing an example of a channel in time-frequency domain.
Figure 6:
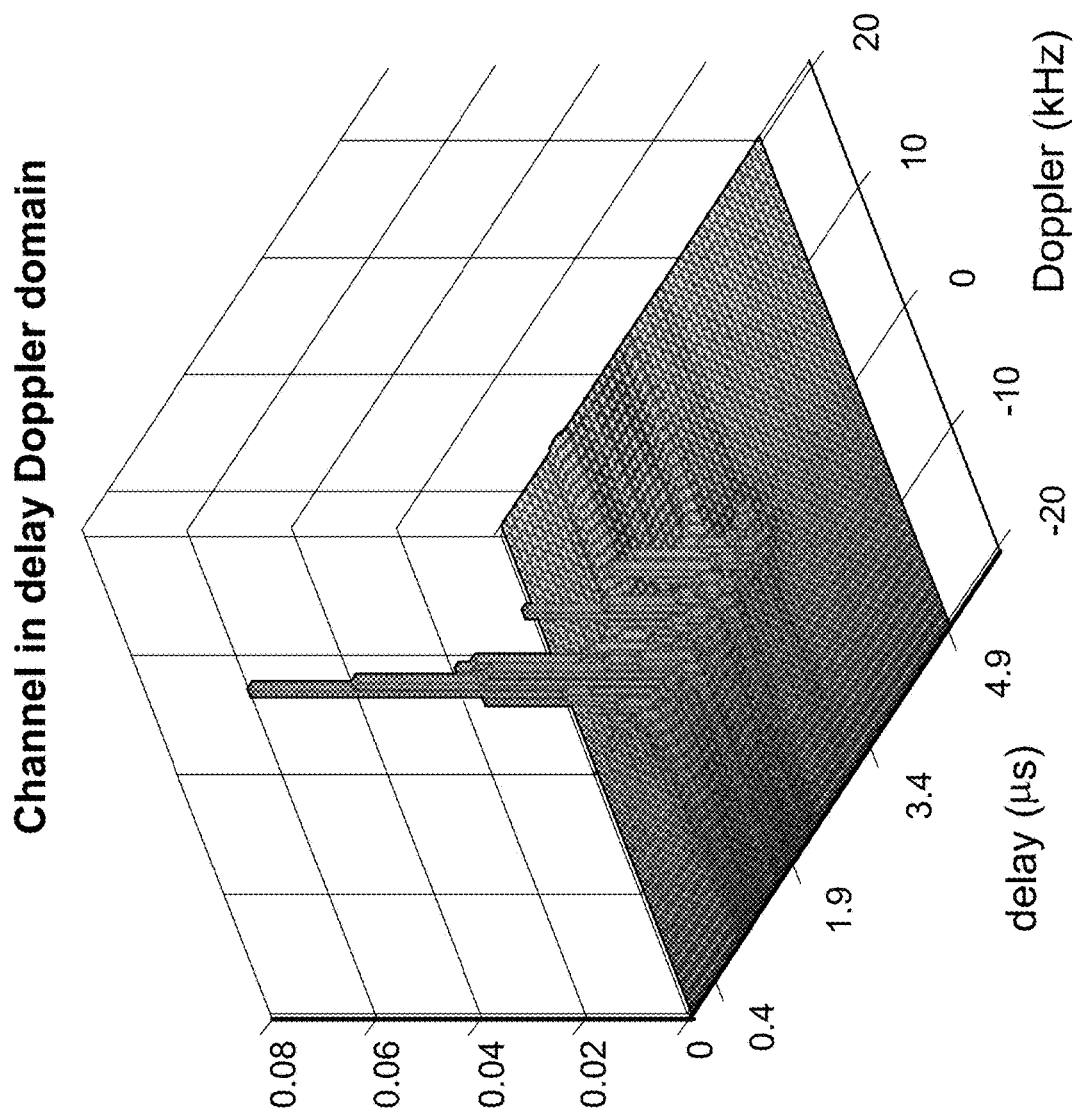
FIG. 6 is a graph showing an example of a channel in delay-Doppler domain.
Figure 7:
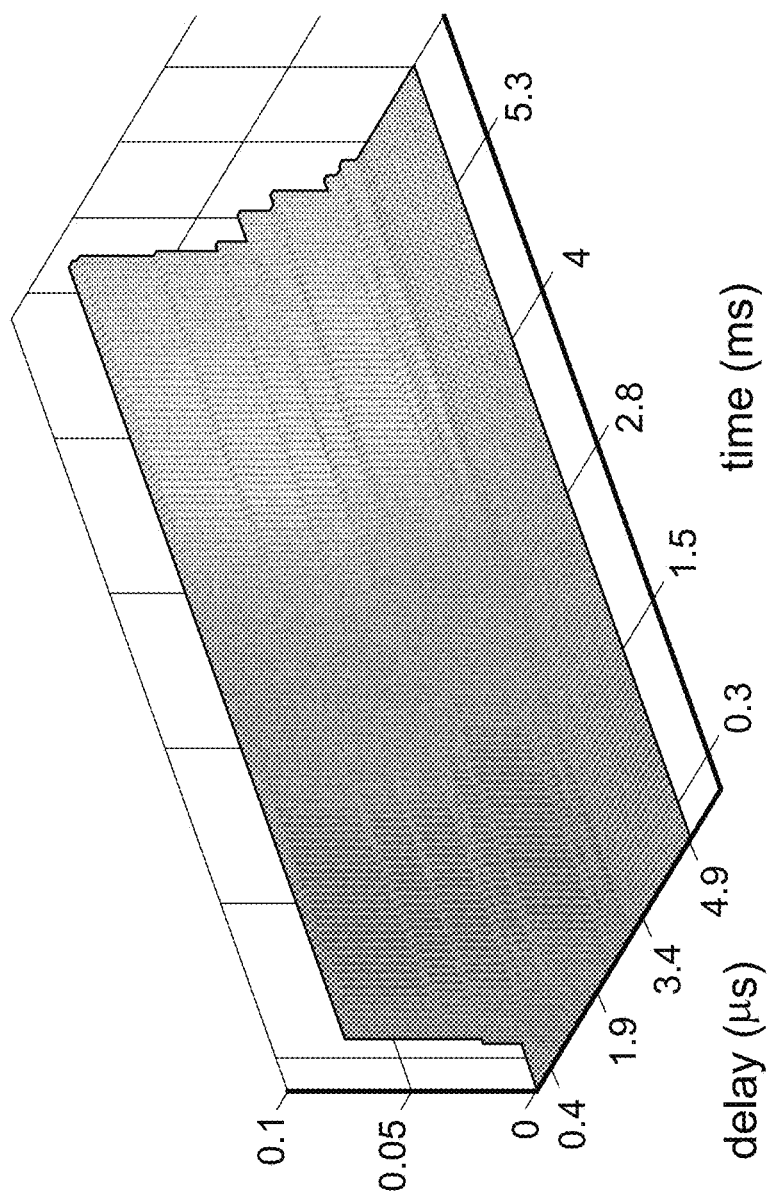
FIG. 7 is a graph showing an example of a channel in delay-time domain.

The channel acquisition methods described in this section utilize the hybrid delay time domain. In this domain, channels are local convolution along delay (which makes separating the pilots easy) and non-local multiplicative along time (which makes interpolating and predicting easy). FIG. 5, FIG. 6 and FIG. 7 show examples of this process.

4.1 Pilot Separation in the Delay Time Domain

Figure 8:
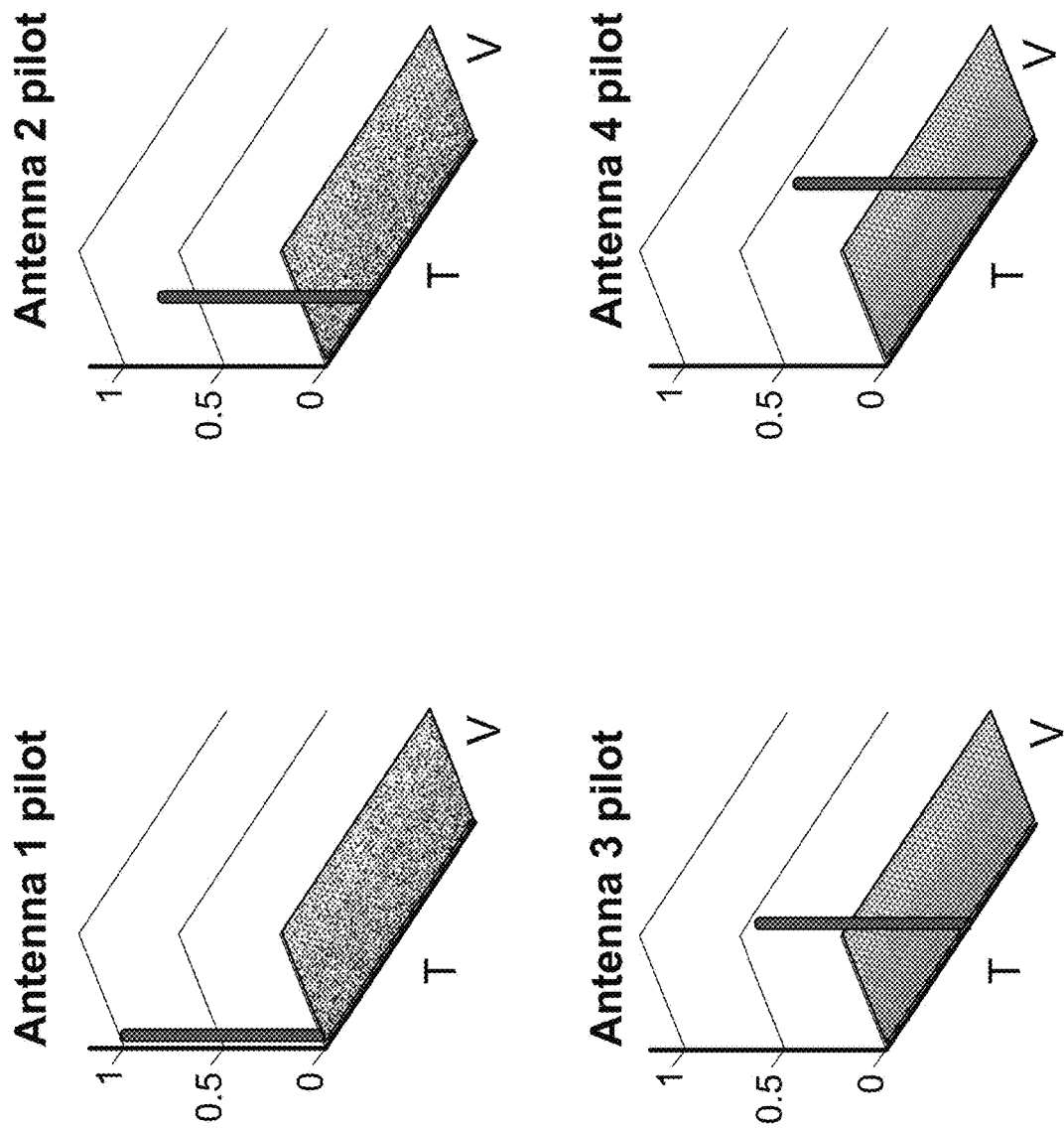
FIG. 8 shows examples of chirp sequences on the Delay-Doppler plane. The span of the plane is 1/df in the delay dimension and 1/(Ndt) in the Doppler dimension.

Assume that 4 pilots are transmitted by 4 hub antenna ports, and that the pilots are Diracs located on the Delay-Doppler plane at:

$$(\tau, \nu) = (0, 0), \left(\frac{1}{4df}, 0\right), \left(\frac{2}{4df}, 0\right), \left(\frac{3}{4df}, 0\right)$$

as shown in FIG. 8.

On the Time-Frequency pilot sub-lattice, each receive antenna may receive a linear combination of each pilot distorted by its own channel. To separate the pilots, the received signal may be converted from the Time-Frequency domain to the delay time domain. This may be accomplished via a one dimensional Fourier transform across the frequency dimension. Knowing that channels act by convolution in the delay domain, embodiments can compute what the remote antennas will observe. Let the map $s_i: \mathbb{C} (\wedge_{(f,t)}^{Down}) \mathbb{C}$ denote the signal received by the i'th remote antenna on downlink sub-lattice. Then in delay time domain, the following equality can be written:

$$s_i(\tau, kNdt + dt) = \sum_{j=1}^{4} h_{ij}\left(\tau - \frac{j-1}{4df}, kNdt + dt\right),$$

for all $k \in \mathbb{Z}$ and $$\tau \in \left[0, \frac{1}{df}\right).$$

Where $h_{ij}$ denotes the channel between the j'th hub antenna and the i'th remote antenna in the delay time domain.

Figure 9:
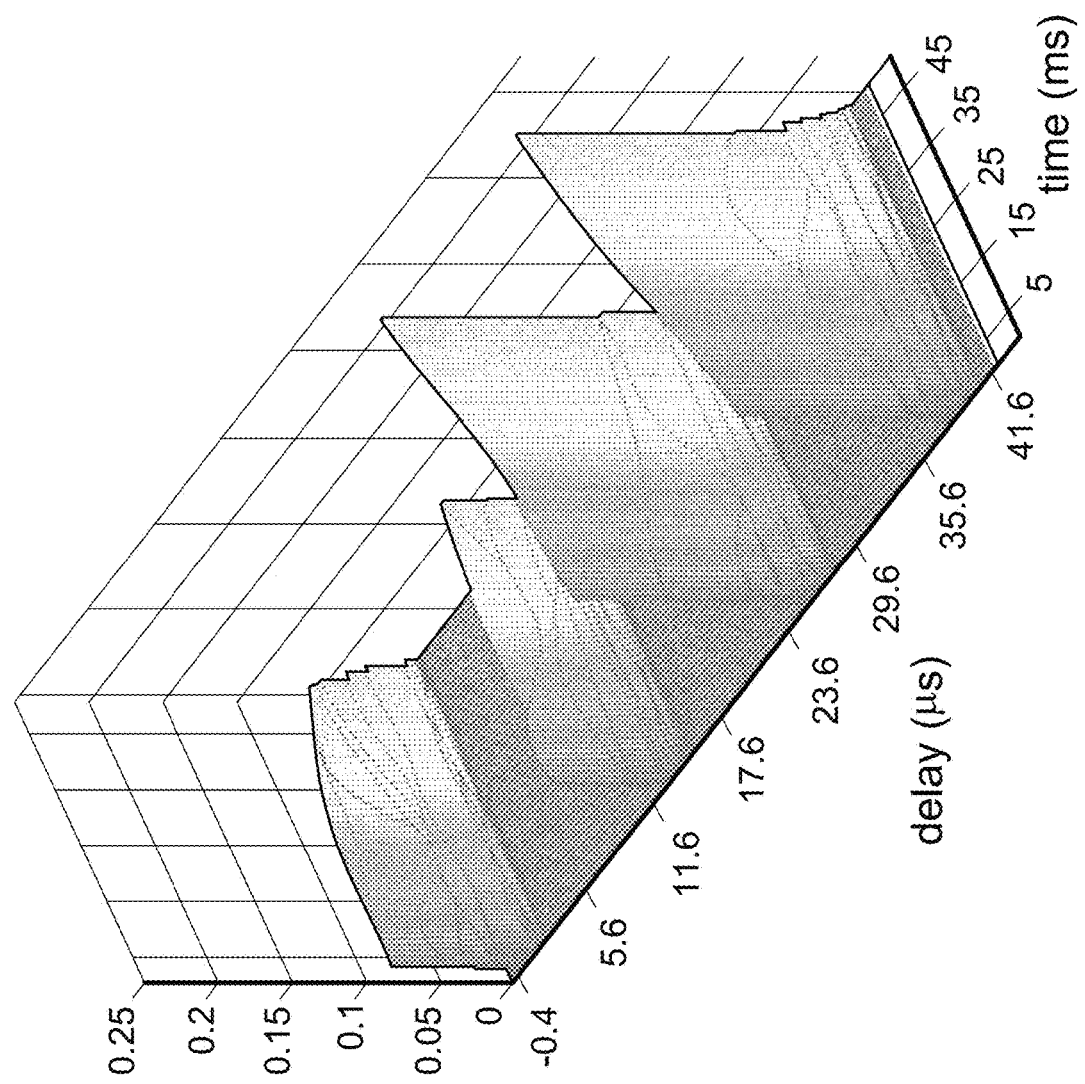
FIG. 9 is a graph showing an example of a signal received by a single remote antenna in the delay time domain.

FIG. 9 shows the 4 pilots of FIG. 8 after going through their separate channels as observed by the receiver in the delay time domain.

Using the above equation, the different pilot (i.e. channel) responses can be isolated via windowing. Namely, to isolate $h_{ij}$ some embodiments may apply the following square mask to $s_i$ in the delay time domain:

$$M_{ij}(\tau, kNdt) = \begin{cases} 1 & \text{if } \left|\tau - \frac{j-1}{4df}\right| \leq \Delta\tau \\ 0 & \text{else} \end{cases}$$

where $\Delta\tau$ denotes the delay spread of the channel.

4.2 Windowing

Windowing the measured channel in the Time-Frequency domain (e.g. using a squared cosine window) makes the channel responses typically better isolated in the delay domain, thus making pilot separation more effective.

Furthermore, $M_{ij}(\tau, kNdt)$ can get other values. When the observation window in the frequency dimension is very large $M_{ij}(\tau, kNdt)$ could be reduced to be close to ½ the delay spread. In other cases, e.g. when using a square window in the Time-Frequency domain, a larger value for $M_{ij}(\tau, kNdt)$ may result in a better performance.

4.3 Channel Interpolation and Prediction in the Delay Time Domain

In the previous section, it was described how the signal received by the receive antennas could be used to extract the channel between each pairing of transmit and receive antenna restricted to the pilot sub-lattice.

FIG. 10 is a graph showing an example interpolation problem. The graph on the left shows a channel response measured on the pilot sub-lattice. The graph on the right shows the desired channel response, where intermediate values of the channel response missing from the values measured from pilot signals have to be generated at a receiver.

Figure 11:
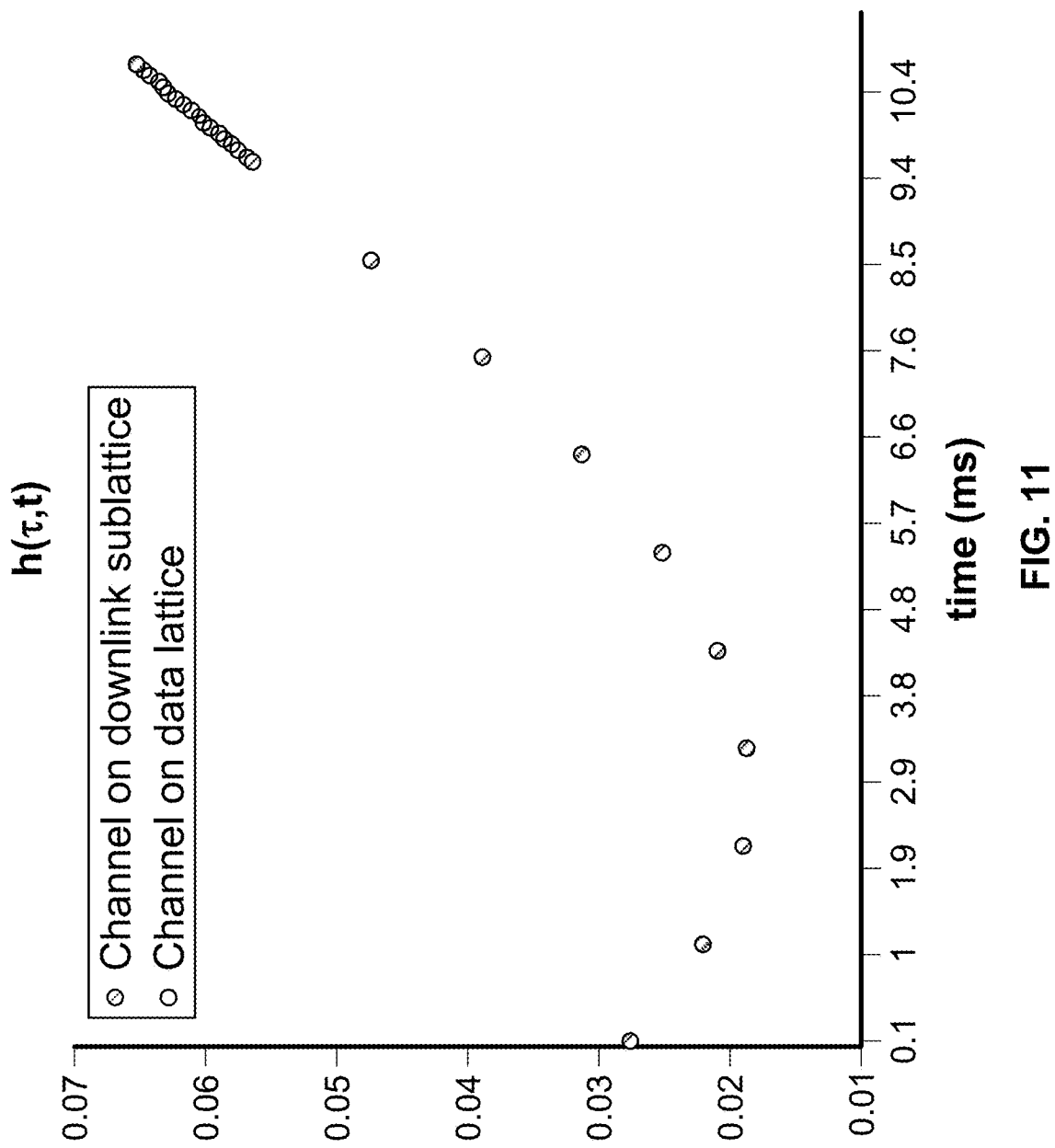
FIG. 11 is a graph showing an example of a one dimensional interpolation problem. For each delay value τ use the value of the channel on the pilot sub-lattice to estimate the channel on the data lattice.

FIG. 11 is a graph showing an example of a one dimensional interpolation problem. For each delay value r, some embodiments may use the value of the channel on the pilot sub-lattice (including two or more pilot sub-lattice points) to estimate the channel on the data lattice.

Implementations should also address the problem of interpolation and prediction. That is, how can the channel be estimated for a past or future portion of the data lattice?

The solution some embodiments may use is to turn the problem into a collection of one-dimensional problems. Namely, for each delay value the channel may be interpolated or extrapolated across time.

The fact that the channel is band limited with respect to time means the problem is tractable. There are a wide variety of methods which can be used to perform the one dimensional interpolation or prediction, for example:

- Spline: A piecewise polynomial is found which takes the value of the measured channel on the downlink sub-lattice. The values of the resulting function on the data lattice are used as an estimate for the channel.
- MMSE: The channel is assumed to be a random band limited function. Based on this assumption and the measurements of the channel on the downlink sub-lattice, the most likely values of the channel on the data lattice are computed.
- Fourier transform: A discrete Fourier transform (DFT) is taken of the channel measured on the downlink sub-lattice. All Fourier coefficients corresponding to frequencies greater than the channel bandwidth are set the zero. The Fourier coefficients are then zero padded and an inverse DFT is taken. The values of the resulting function on the data lattice are used as an estimate of the channel.

Figure 12:
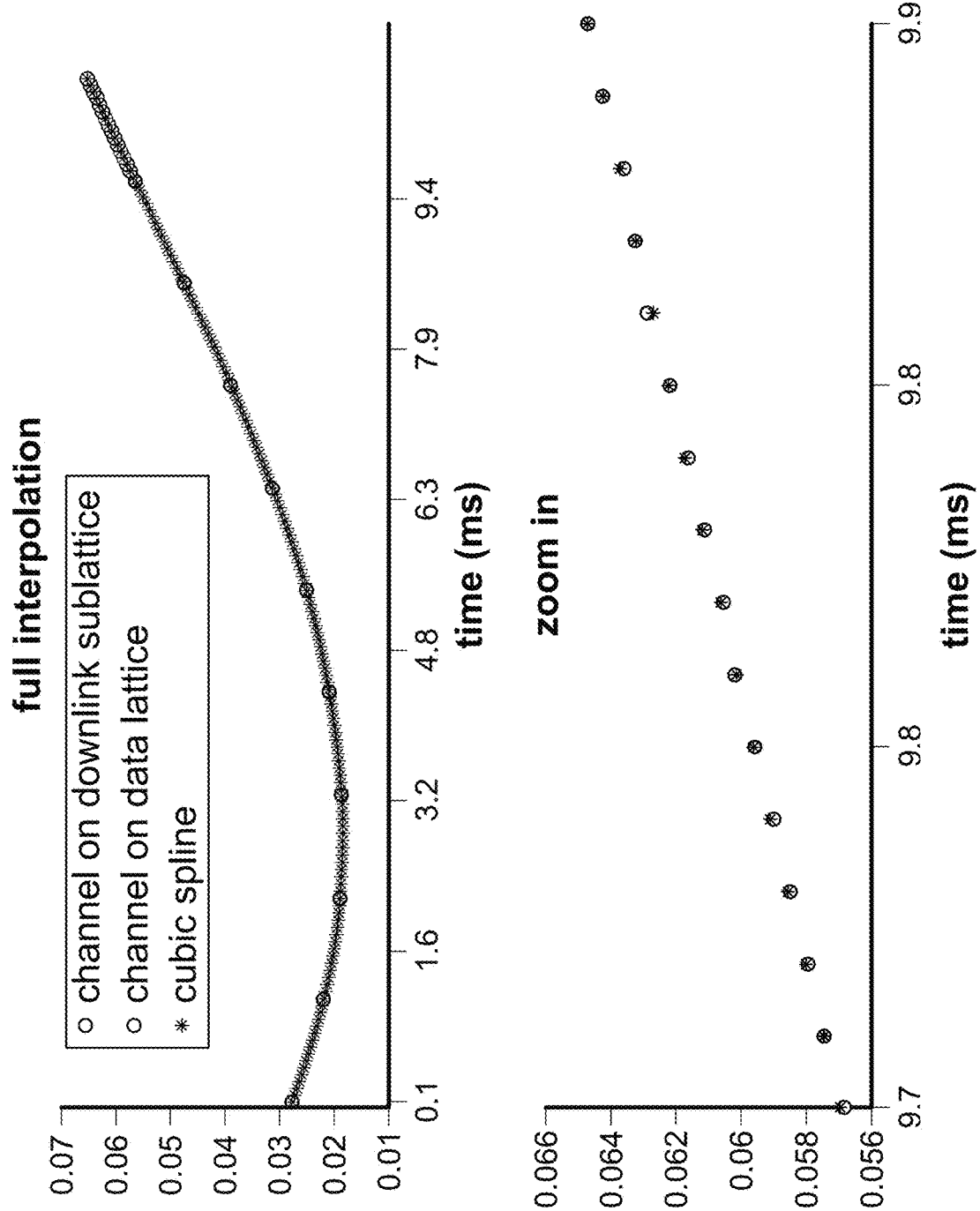
FIG. 12 is a graph showing an example of a result of cubic spline interpolation. Top: shows the full spline. Bottom: zooms into the region where channel estimation is desired. The spline provides an excellent estimator of the channel.

All three methods can be efficiently implemented using linear algebra. FIG. 12 shows the result of applying the cubic spline interpolator to the channel displayed in FIG. 11.

Once the channels have been interpolated/extrapolated in the delay time domain taking the inverse Fourier transform across delay converts the channel into the Time-Frequency domain. In some embodiments, the receiving device may perform the following four steps for channel estimation:

[1] Convert to the delay time domain by taking the Fourier transform of the signal measured on the downlink sub-lattice.
[2] Separate the channel response between the different hub and remote antenna pairings by applying square masks.
[3] Estimate the channel on a portion of the data lattice by interpolating or extrapolating the channel responses across time.
[4] Convert the channel to the Time-Frequency domain by taking an inverse Fourier transform across delay.

Instead of applying the inverse Fourier transform described in step 4 on the full delay span of the Delay-Doppler plane, some embodiments could apply the inverse Fourier transform only on the masked portion, or just the portion of the delay span around the pilot that is associated with the pilot lattice, and then, in the Time-Frequency domain, applying again the Spline or MMSE methods described above.

5. DELAY-DOPPLER DOMAIN CHANNEL ACQUISITION

The channel acquisition methods described in this section utilize the Delay-Doppler domain. In this domain channels are local convolution along both delay and Doppler. In this case received signal is converted from the Time-Frequency domain to the Delay-Doppler domain. This is accomplished via a two dimensional symplectic Fourier transform.

Similar to what is described in Section 4.1, the different pilot (i.e. channel) responses can be isolated via windowing. In this case a two dimensional Delay-Doppler window is applied, so to isolate $h_{ij}$ that corresponds to the 4 pilots in Section 4.1 apply the following square mask to $s_i$ in the Delay-Doppler domain:

$$M_{ij}(\tau, \nu) = \begin{cases} 1 & \text{if } \left|\tau - \frac{j-1}{4df}\right| \le \Delta\tau \text{ and } |\nu| \le \Delta\nu \\ 0 & \text{else} \end{cases}$$

where $\Delta\tau$ and $\Delta\nu$ denote the delay and Doppler spreads of the channel.

In some embodiments, the measured channel may be windowed in the t-f domain. Windowing the measured channel in the Time-Frequency domain (e.g. using a squared cosine window) makes the channel responses better isolated in the Delay-Doppler domain, thus making pilot separation more effective.

$M_{ij}(\tau, \nu)$ can get other values. When the observation window in the frequency dimension is very large, the size of $M_{ij}(\tau, \nu)$ could be reduced to be close to ½ the delay spread. In other cases, e.g. when using a square window in the Time-Frequency domain, a larger size $M_{ij}(\tau, \nu)$ may result in a better performance.

In various embodiments, the pilots could be placed in both dimensions, e.g. 8 pilots could be Dirac delta functions located on the Delay-Doppler plane at:

$$(\tau, \nu) = (0, 0), \left(\frac{1}{4df}, 0\right), \left(\frac{2}{4df}, 0\right), \left(\frac{3}{4df}, 0\right),$$
$$\left(0, \frac{1}{2dt}\right), \left(\frac{1}{4df}, \frac{1}{2dt}\right), \left(\frac{2}{4df}, \frac{1}{2dt}\right), \left(\frac{3}{4df}, \frac{1}{2dt}\right).$$

In this case there would be a need to also separate the pilots in the Doppler dimension where this windowing could be applied for the purpose of pilot separation.

After applying the window, the channel can be estimated by either applying the 2-D Symplectic DFT of the masked Delay-Doppler plane, or alternatively applying the 2-D Symplectic DFT on a portion of the plane and then applying a 2 dimensional Spline or MMSE in the time-frequency plane to estimate the channel on the desired portion of the Time-Frequency plane.

6. OTFS BASED REFERENCE SIGNAL INTRODUCTION

Sections 7-9 below provide a description for embodiments for pilot signal generation, transmission and reception in wireless networks.

7. OTFS BASED REFERENCE SIGNALS 7.1 Brief Summary

In general, OTFS based reference signals may be sent separately from the data. The idea is that the reference signals can be sent on a time-frequency lattice which is coarser than the data lattice.

Assume the time-frequency (t-f) lattice of the data is defined by the following discrete points:

$$\Lambda_{t,f}^D = \mathbb{Z}dt \oplus \mathbb{Z}df = \{(Kdt, Ldf): K, L \in \mathbb{Z}\} \quad (1)$$

The t-f lattice for the reference signals (pilots) will be a subset of the data lattice:

$$\Lambda_{t,f}^P = \mathbb{Z}Ndt \oplus \mathbb{Z}Mdf \quad (2)$$

$$N, M \geq 1$$

The Delay-Doppler ($\tau$, $\nu$) tori associated with the two lattices are:

Data torus with circumferences $$C_\tau^D = 1/df$$

$$C_\nu^D = 1/dt$$

Pilot torus with circumferences $$C_\tau^P = 1/(Mdf)$$

$$C_\nu^P = 1/(Ndt)$$

Figure 13:
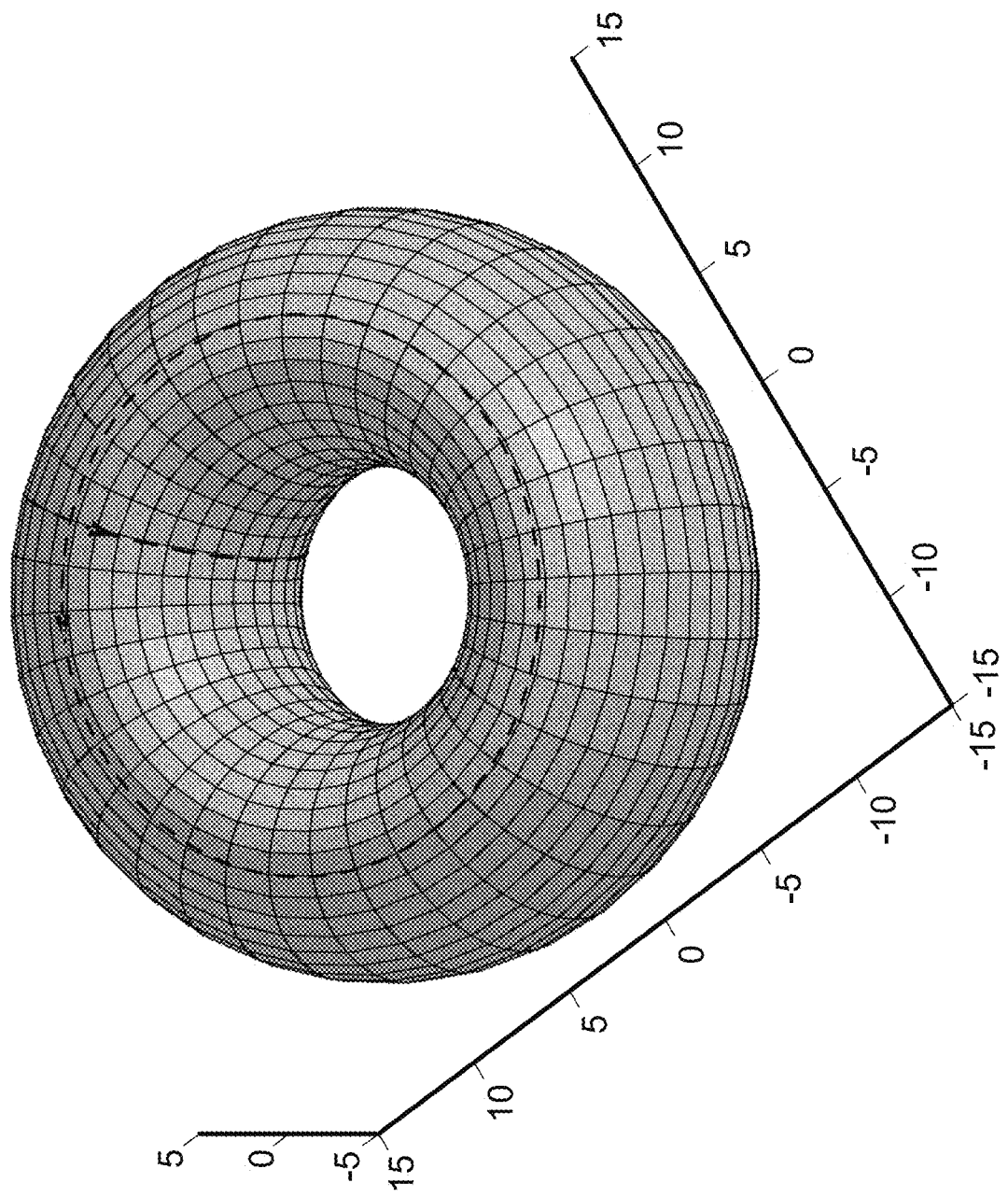
FIG. 13 shows an example of a torus with a larger delay circumference than Doppler circumference.

FIG. 13 shows an example of a torus.

It can be shown that a function X[K, L] on the t-f lattice defined in (1) can be transformed to a 2-D (continuous periodic) function on the associated torus using a symplectic discrete Fourier transform defined as $$x(\tau, \nu) = SDFT(X[K, L]) \triangleq \sum_{K,L} X[K, L] e^{-j2\pi(\nu Kdt - \tau Ldf)} \quad (3)$$

The inverse transform of $x(\tau, \nu)$ to X[K, L] is an inverse symplectic Fourier transform defined as:

$$X[K, L] = SDFT^{-1}(x(\tau, \nu)) \triangleq \frac{1}{dtdf} \int_0^{\frac{1}{df}} \int_0^{\frac{1}{dt}} x(\tau, \nu) e^{j2\pi(\nu Kdt - \tau Ldf)} d\nu d\tau \quad (4)$$

Limiting the data and pilot lattices to the 2-D discrete intervals k×l and n×m respectively:

$$(\Lambda_{t,f}^D)_{k,l} = [0: k-1]dt \oplus [0: l-1]df$$

$$(\Lambda_{t,f}^P)_{n,m} = [0: n-1]Ndt \oplus [0: m-1]Mdf$$

translates to uniformly sampling the respective tori to k×l and n×m samples. These sampled tori create lattices that are reciprocal to their associated lattices in the t-f plane and are defined as follows:

$$\Lambda_{\tau,\nu}^D = (\Lambda_{t,f}^D)^\perp = \mathbb{Z}/df \oplus \mathbb{Z}/dt = \left\{\left(K\frac{1}{df}, L\frac{1}{dt}\right): K, L \in \mathbb{Z}\right\} \quad (5)$$

$$\Lambda_{\tau,\nu}^P = (\Lambda_{t,f}^P)^\perp = \mathbb{Z}/Ndf \oplus \mathbb{Z}/Mdt \quad (6)$$

$$N, M \geq 1$$

Figure 14:
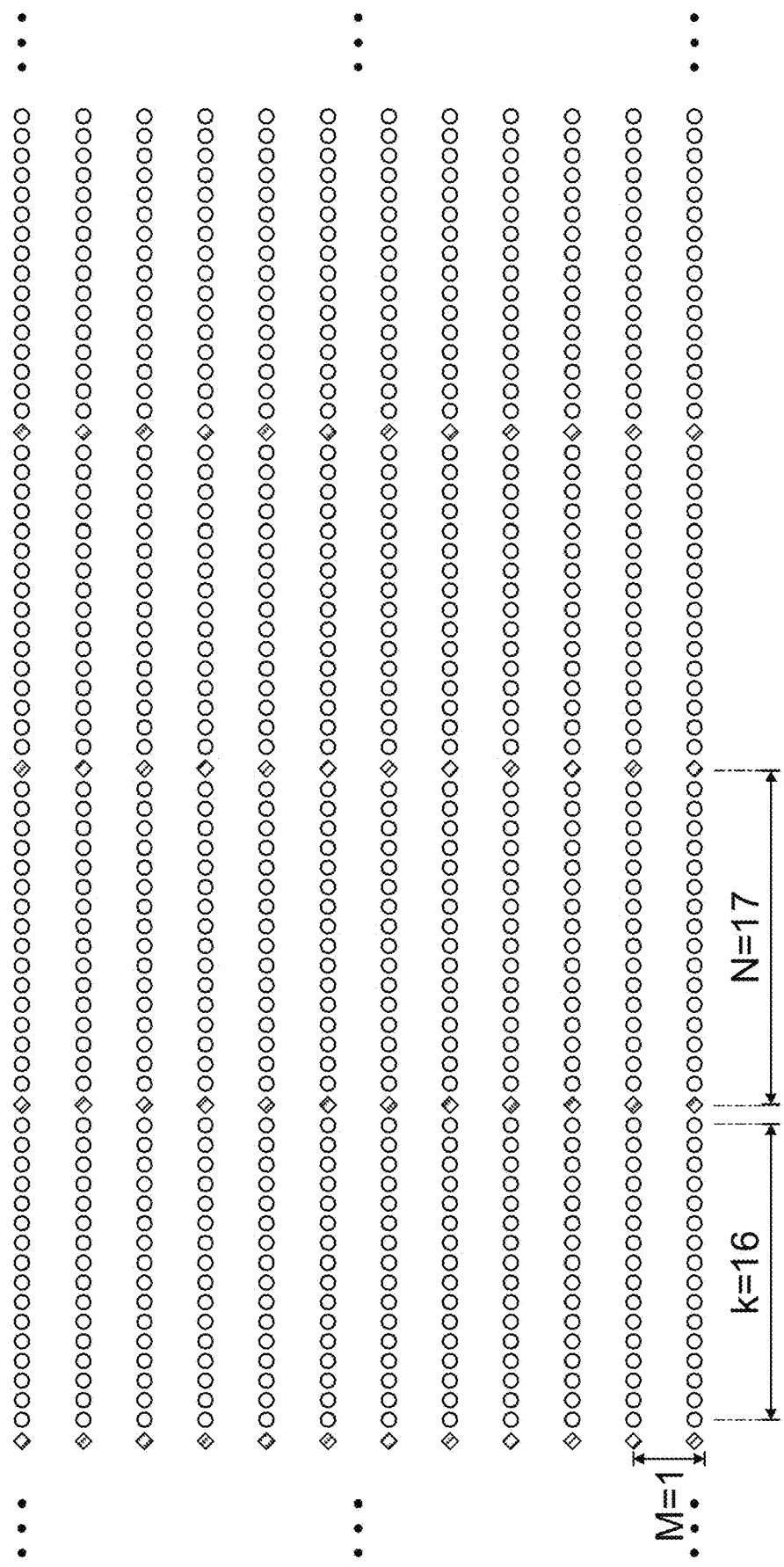
FIG. 14 shows examples of t-f Plane of Pilot (red) and Data (green) when k=N−1 and M=1.

When choosing k=N—1, M=1, and l=m, the t-f plane will look as shown in FIG. 14, where the horizontal axis corresponds to time and the vertical axis corresponds to frequency. The filled in points correspond to pilots and the hollow circles correspond to data.

A reference signal can be viewed as a symplectic exponential restricted to a subset of points in the data lattice. If this subset is regular (i.e. forms a sub-lattice) the reference signal is considered structured, otherwise it is considered non-structured.

7.2 2-D Structured Reference Signals

2-D structured reference signals are pilots that are generated on the Delay-Doppler plane which is associated with a sub-lattice of the data lattice (N>1, M≥1). These pilots are multiplexed in the t-f domain with the data.

There are multiple approaches that could be used to efficiently generate 2-D structured OTFS based reference signals for a given Delay-Doppler spread and allowed channel overhead. The following subsections describe three approaches.

Some embodiments could choose to implement a relaxed version of any of these approaches and/or combinations of the approaches depending on usage scenarios and/or limitations such as backward compatibility, simplicity of implementation, etc.

7.2.1 Delay-Doppler Packing Reference Signals

The Delay-Doppler Packing reference signals may be generated as follows:

(1) Choose the finest t-f pilot lattice (smallest N and M) that meets the allowed overhead (2) Include, in the continuous Delay-Doppler torus associated with the selected pilot lattice, as many pilots as possible (spaced as sparsely as possible) while considering the ability of receivers to achieve good enough pilot separation and channels estimation for the expected delay and Doppler spreads of the channels.

(3) Transform the Delay-Doppler plane to the t-f plane (e.g., symplectic Fourier transform).

(4) Apply the n×m window to create the n×m discrete intervals.

Some of the parameters that may have an impact on how many pilots can be supported by a given pilot torus are: the size of the pilot observation window (selection of n and m), the delay and Doppler spreads of the channel, and the receiver implementation (e.g. t-f window size and shape, interpolation and pilot separation algorithms). A large enough t-f window (large n and m) will allow optimal packing of up to $N_{DD}^P$ pilots:

$$N_{DD}^P = \lfloor C_\tau^P/\Delta_\tau \rfloor \cdot \lfloor C_\nu^P/\Delta_\nu \rfloor$$

where $\lfloor x \rfloor$ is the largest integer smaller than x, $\Delta_\tau$ is the delay spread of the channel, and $\Delta_\nu$ is the Doppler spread of the channel.

Figure 15:
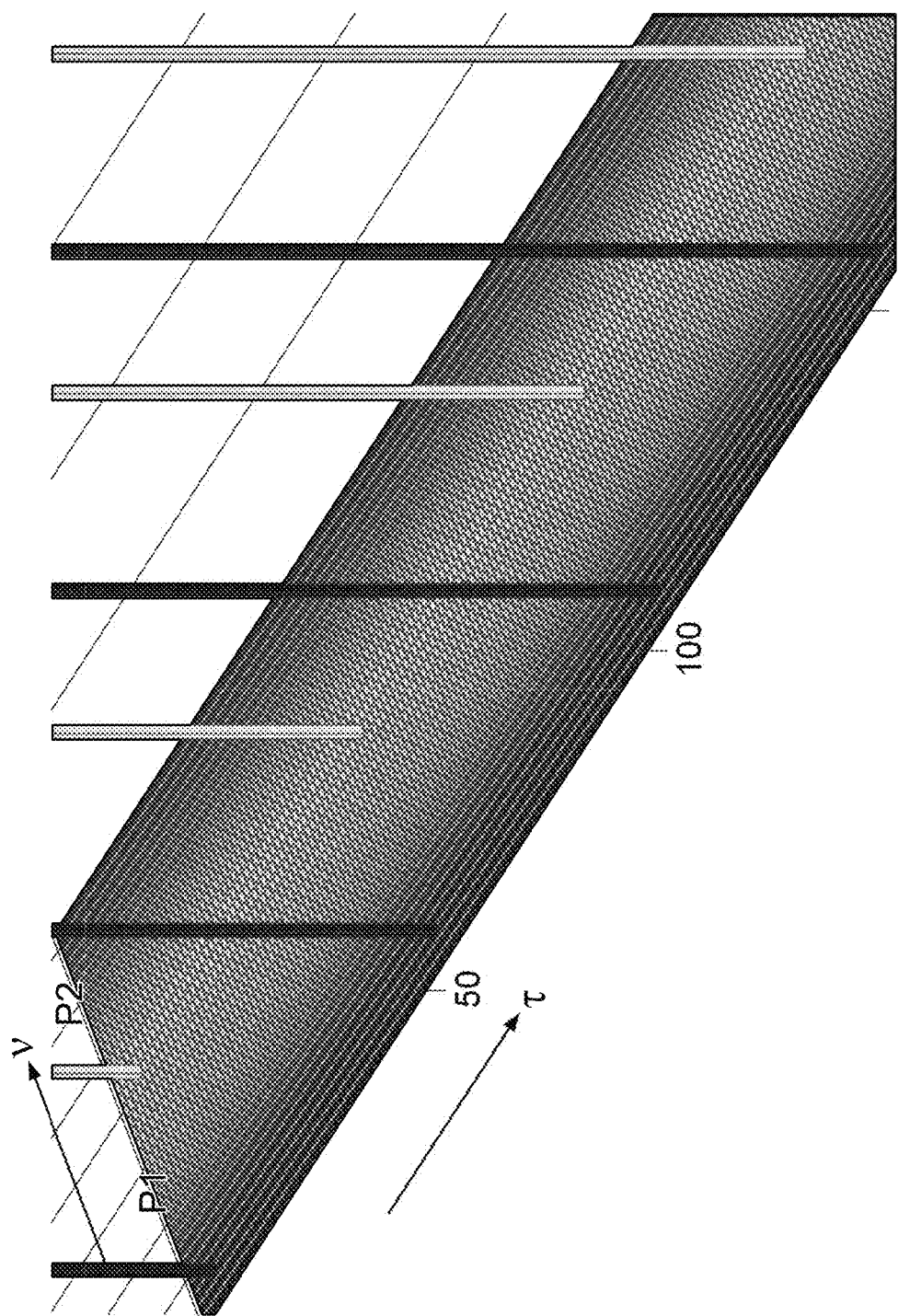
FIG. 15 is a graph showing an example of packing of 8 pilots (4×2) in the Delay-Doppler plane.

FIG. 15 shows an example of packing of 8 reference signals in the Delay-Doppler plane (the $\tau$ axis represents time and the $\nu$ axis represents Doppler).

7.2.1.1 EXAMPLE

The following example shows how implementations can use the Delay-Doppler Packing to generate a large number of reference signals with low overhead in an enumeration similar to the LTE enumeration.

Assume the following:
Channel:
  Bandwidth: 10 Mhz
  Delay spread: $\Delta_\tau$=5 us
  Doppler spread: $\Delta_v$=300 Hz ptp (150 Hz peak)
Data Lattice (see Eq. (1)):
  dt=66.67 us
  df=15 Khz
  Allowed overhead: <7%
Delay-Doppler Packing solution:

To meet the allowed overhead requirement, one solution can be to assign every 15$^{th}$ lattice point in the time domain and all the lattice points in the frequency domain to the reference signals, resulting in the following Delay-Doppler Packing:

Pilot Lattice (see Eq. (2)):
  N=15
  M=1
Associated Pilot torus:
  Delay circumference: $C_\tau^P$=1/(Mdf)=66.67 us
  Doppler circumference: $C_v^P$=1/(Ndt)=1000 Hz An optimal packing with a large t-f window will support up to the following number of pilots:

$$N_{DD}^P = \lfloor C_\tau^P / \Delta_\tau \rfloor \cdot \lfloor C_v^P / \Delta_v \rfloor = \lfloor 66.67/5 \rfloor \cdot \lfloor 1000/300 \rfloor = 13 \cdot 3 = 39$$

For the purpose of this example, assume the implementation uses a Raised Cosine (RC) filter in both the transmitter and the receiver with the following Tx/Rx windows:
  Number of time samples: 50 (n=36, and additional 14 for the RC filter)
  Number of frequency samples: 626 (m=500, and additional 126 for the RC filter)
Pilot packing: For this example, we limit the number of pilots to 20 and stack them as follows:
  Number of pilots in delay domain: 10
  Number of pilots in Doppler domain: 2
The pilots will also be positioned with an offset of 4 lattice points in the delay dimension and in the middle of their allocated Doppler interval. This translates to the lattice point (5,9) for the first pilot.

Figure 16:
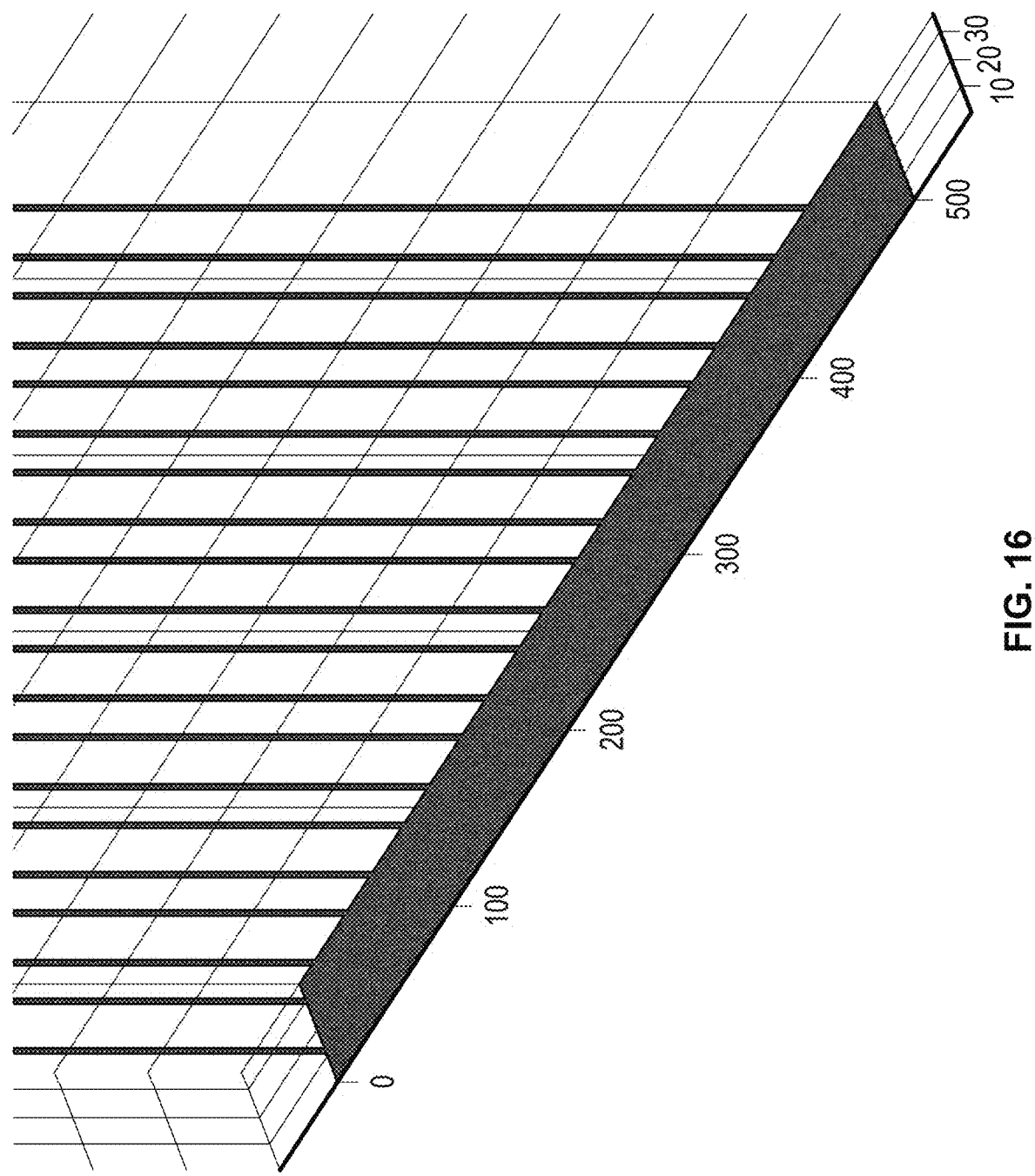
FIG. 16 shows an example embodiment with 20 pilots in the Delay-Doppler plane in lattice points (5+i50,9+j18), i=0 to 49, j=0,1
Figure 17:
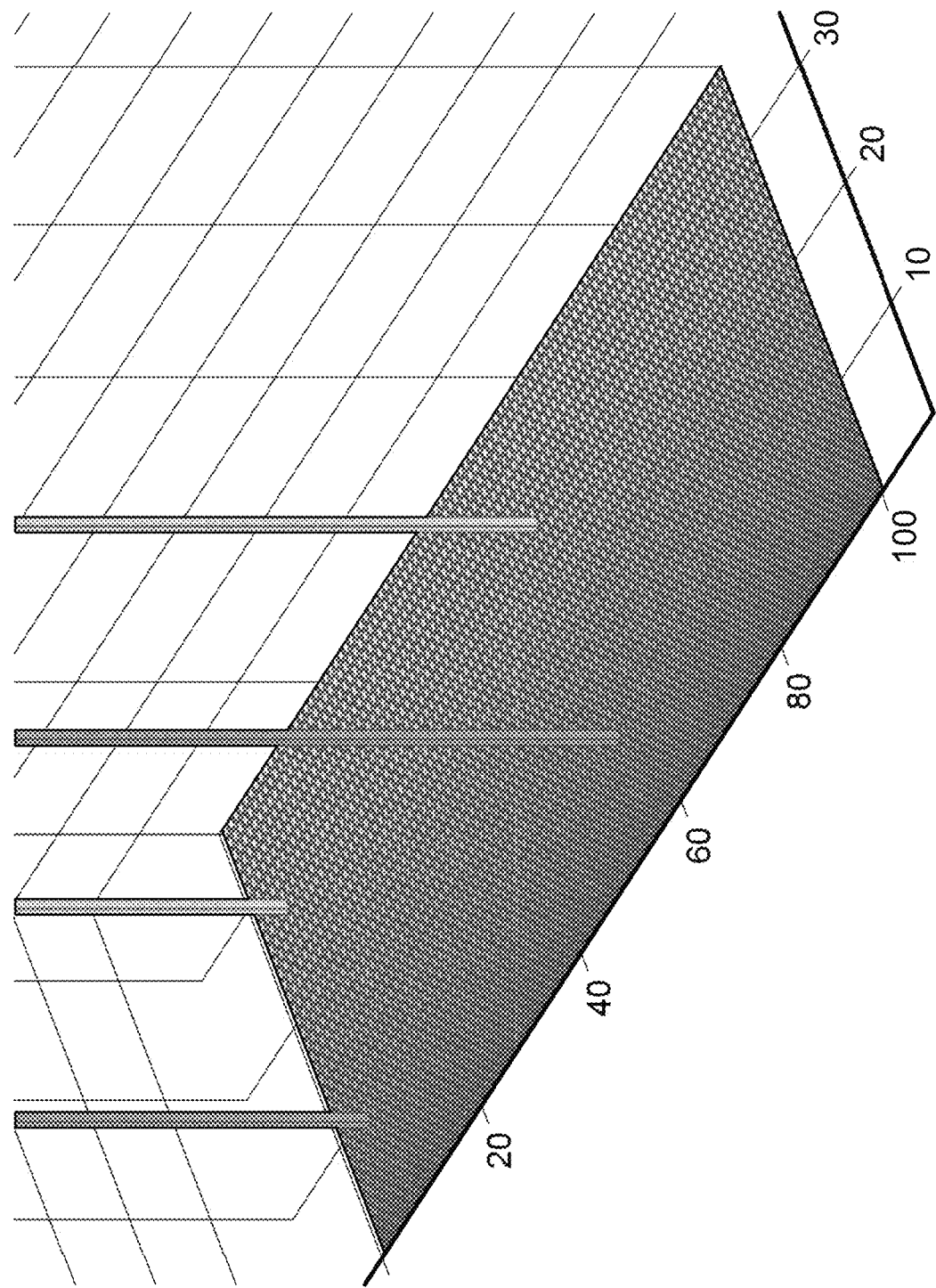
FIG. 17 is a zoomed in picture of the example pilots in FIG. 16.

FIG. 16 shows the 20 pilots in the Delay Doppler plane.
FIG. 17 zooms in to show the pilots in the first 100 lattice points in the delay dimension.

Figure 18:
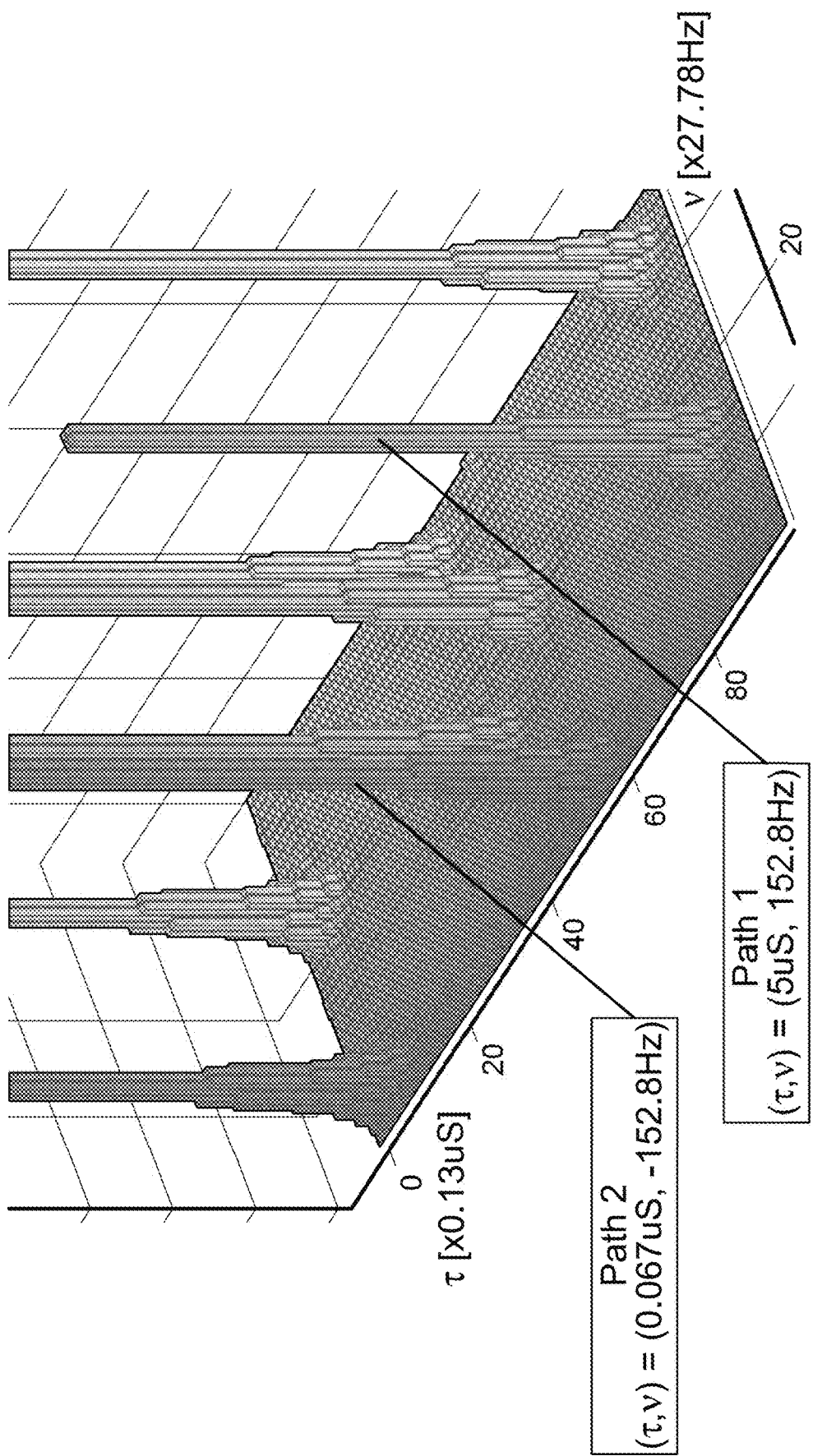
FIG. 18 is a graph showing examples of received pilots after going through a channel with two delay-Doppler paths (showing 4 pilots).

To show the worst case impact of the windows on the channel time-delay spread the graph in FIG. 18 shows the received pilots when the channel is represented by the following two paths (no direct path):
  Path 1: Delay=5 us, Doppler shift=152.8 Hz
  Path 2: Delay=0.067 us, Doppler shift=−152.8 Hz These two paths result in the received pilots being positioned exactly in the middle between lattice points causing the worst leakage of the receive window to neighboring lattice points, which represents the worst case for pilot separation.

The received pilots in the Delay-Doppler plane (zoomed in to show only the pilots in the first 100 lattice points in the delay dimension) are shown in FIG. 18.

Figure 19:
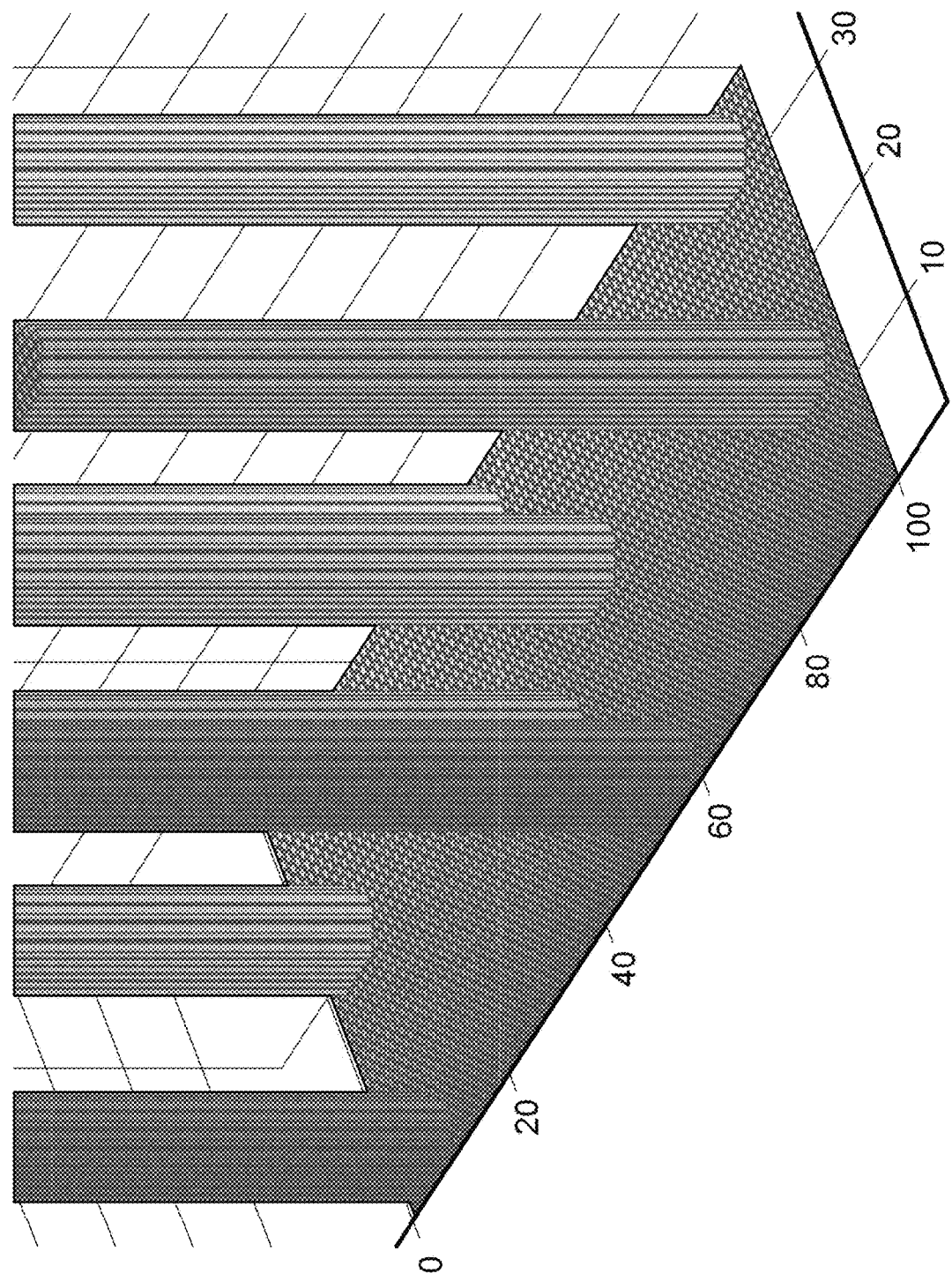
FIG. 19 shows an example of markers of received signal levels above −40 dB of received pilot peak.

FIG. 19 shows the lattice points in the Delay-Doppler plane where the received signal is above −40 dB from the highest level of the received pilot. As can be seen from FIG. 19, the received pilots' leakage to the surrounding pilots is lower than 40 dB below the pilot itself. Other receiver implementations may result in even lower leakage which will allow packing more pilots.

7.2.2 Time-Frequency Packing Reference Signals

The Time-Frequency Packing reference signals are generated as follows:

Choose the coarsest t-f pilot lattice (largest N and M) that can support a single channel estimation (one pilot)

Stager as many of these pilot lattices as possible ($N_{TF}^G$) at equal distances between lattice points without violating the allowed overhead Put a single pilot in the Delay-Doppler torus associated with the selected t-f pilot lattice.

Transform the Delay-Doppler plane to the t-f plane (symplectic Fourier transform)

Create $N_{TF}^G$ copies of the t-f plane and stagger them as stated in step [0162].

Apply the n×m window to each of the t-f planes (may be a different window to each plane).

The size of the pilot window will have an impact on the quality of the channel estimation (a larger lattice will improve the quality of the channel estimation)

Figure 20:
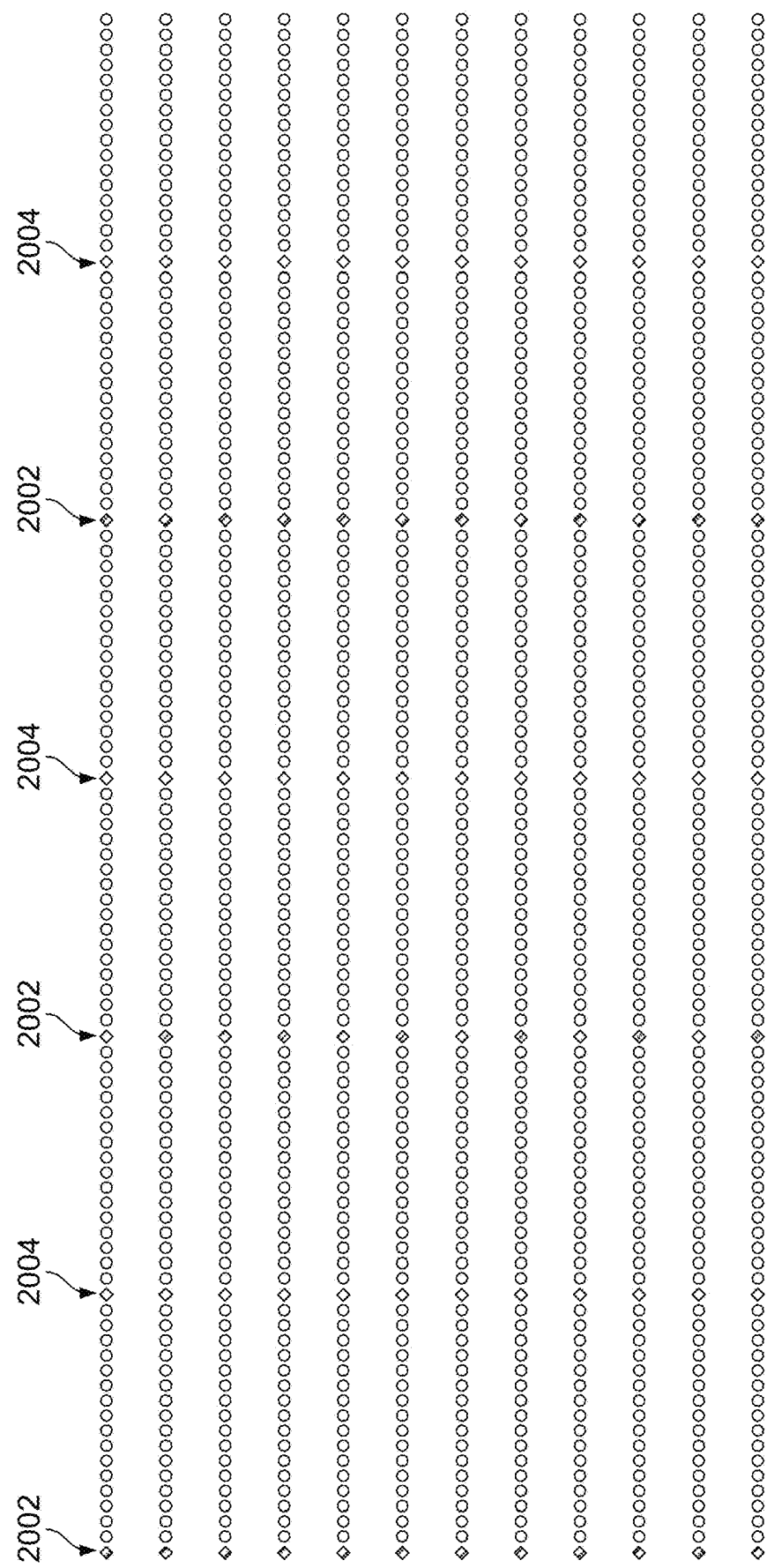
FIG. 20 shows an example of a t-f lattice showing the locations of two Time-Frequency Packed reference signals (red, purple) multiplexed with data (green).

FIG. 20 shows an example of a Time-Frequency packing of two reference signals, indicated by filled in row of lattice points 2002 and 2004, respectively).

7.2.3 Latency Sensitive Packing Reference Signals

The Latency Sensitive Packing reference signals may be generated as follows:

(1) Choose the finest t-f pilot lattice (smallest N and M) that meets the allowed overhead
(2) Choose the smallest size pilot observation window in the time domain (smallest n) that supports one pilot in the Doppler torus (in the Delay Doppler plane).
(3) Include, in the Delay-Doppler torus, as many pilots as possible (spaced as sparsely as possible) while considering the ability of receivers to achieve good enough pilot separation and channels estimation for the expected delay and Doppler spreads of the channels.
(4) Transform the Delay-Doppler plane to the t-f plane (symplectic Fourier transform)
(5) Apply the n×m window to the t-f plane

7.2.3.1 EXAMPLE

Adopting the same assumptions as in the previous example, embodiments can shorten the time interval of the window to pack only one pilot in the Doppler dimension. Assuming RC filters again, the solution may be as follows:
  Number of time samples: 15 (n=9, and additional 6 for the RC filter)
  Number of frequency samples: 626 (m=500, and additional 126 for the RC filter)
Pilot packing: For this example, we limit the number of pilots to 10 and stack them only in the delay domain.

The pilots will be position with an offset of 4 lattice points in the delay dimension and in the middle of the Doppler interval. This translates to the lattice point (5,5) for the first pilot.

To show the worst case impact of the windows on the channel time-delay spread we show the received pilots when the channel is represented by the following two paths (no direct path):

Path 1: Delay=5 us, Doppler shift=166.7 Hz
Path 2: Delay=0.067 us, Doppler shift=−166.7 Hz These two paths result in the received pilots being positioned exactly in the middle between lattice points causing the worst leakage of the receive window to neighboring lattice points, which represents the worst case for pilot separation.

Figure 21:
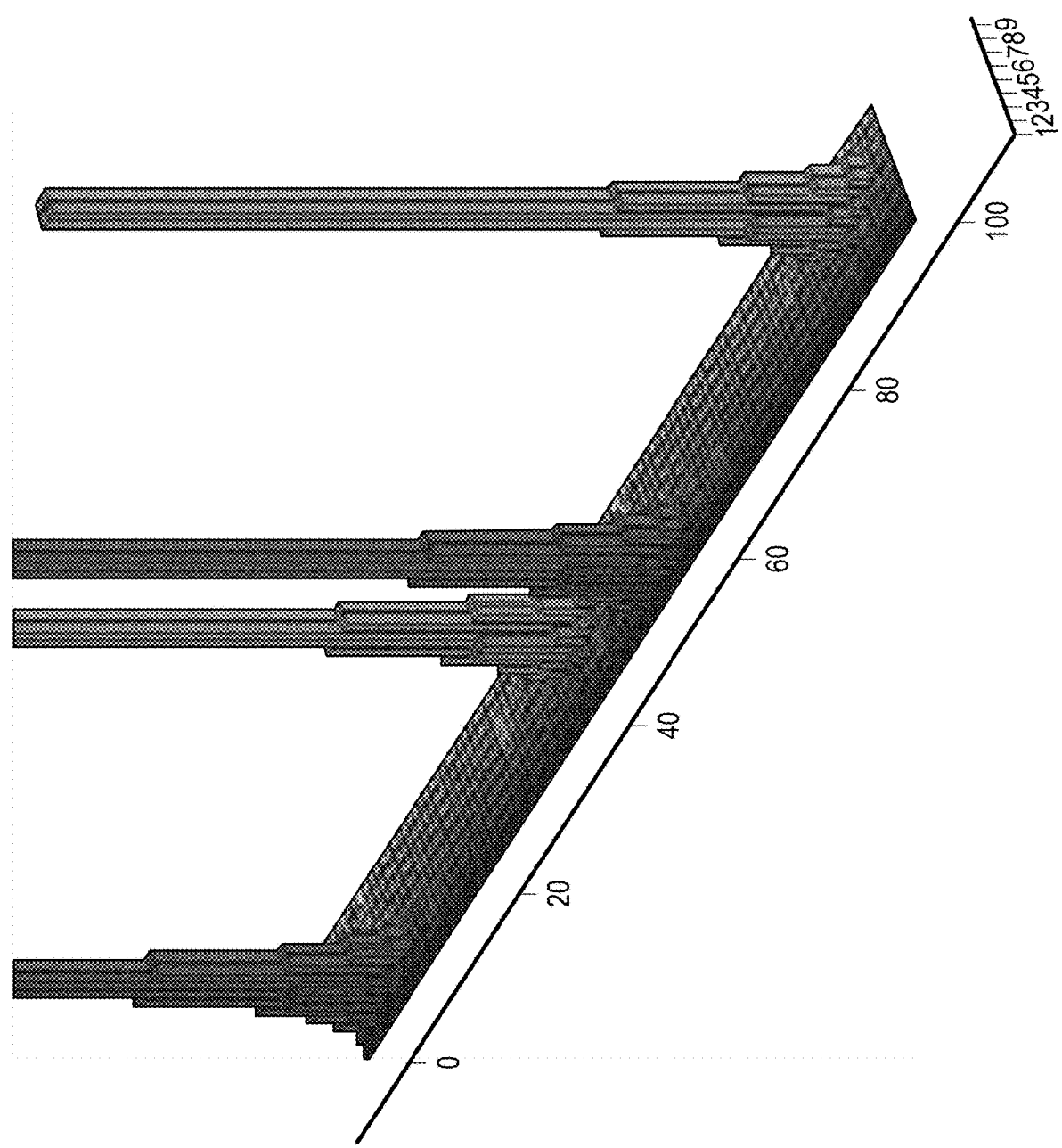
FIG. 21 shows an example of received pilots after going through a channel with two delay-Doppler paths (showing 2 pilots).

The received pilots in the Delay-Doppler plane (zoomed in to show only the pilots in the first 100 lattice points in the delay dimension) are shown in FIG. 21.

Figure 22:
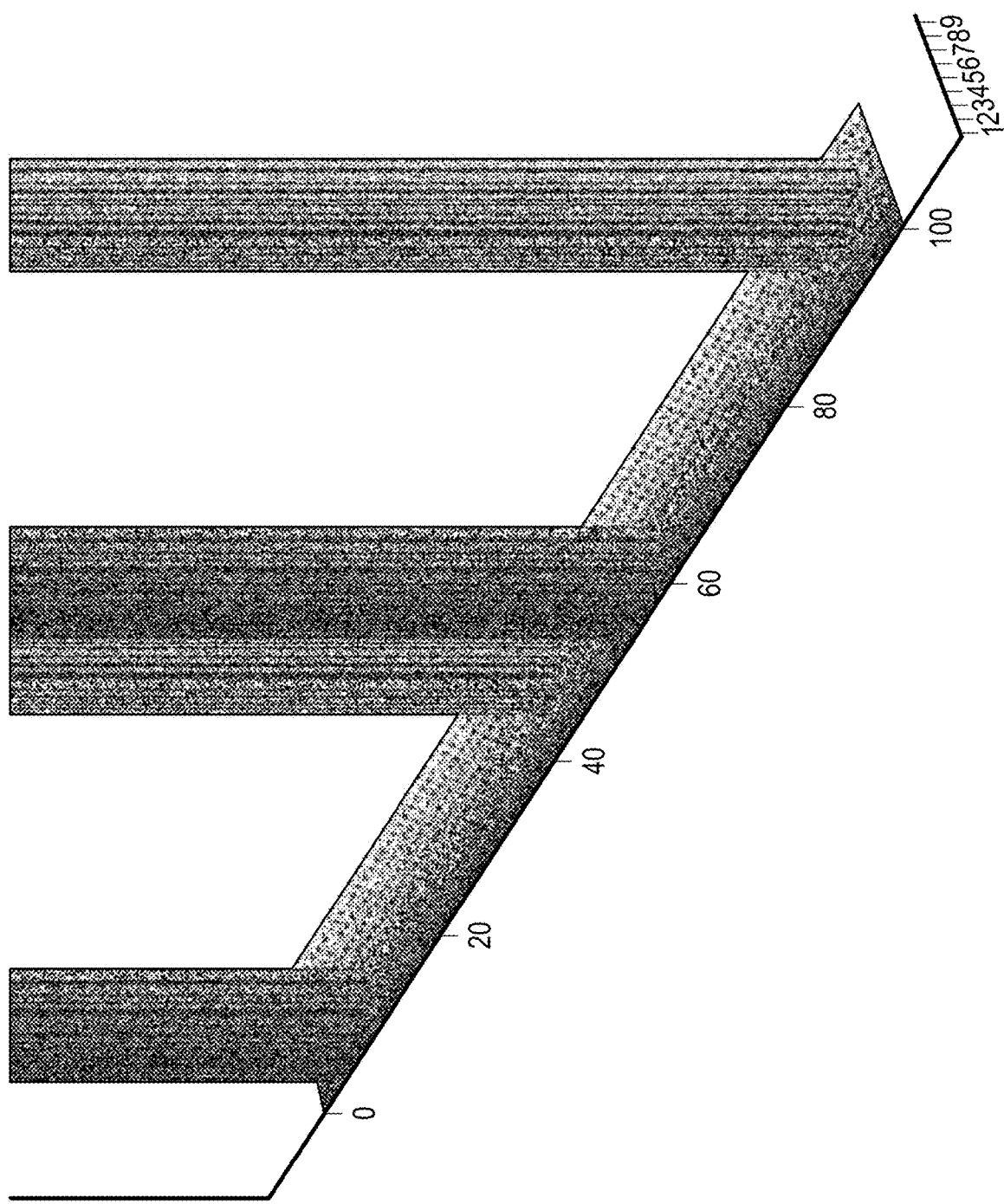
FIG. 22 shows an example of markers of received signal levels above −40 dB of received pilot peak.

FIG. 22 shows the lattice points in the Delay-Doppler plane where the received signal is above −40 dB from the highest level of the received pilot.

7.3 2 Non-Structured Reference Signals

Non-structured reference signals RE pilots that are generated on a Delay-Doppler torus with the same circumference as the data torus, transformed to the t-f plane and then restricted to a limited number of lattice points on the t-f lattice. The number of lattice points assigned to the reference signals, and their locations, will dictate how many pilots can be supported by that assignment.

8. EXAMPLES OF OTFS BASED DOWNLINK REFERENCE SIGNALS 8.1 Cell-Specific Reference Signals Cell-specific reference signals are transmitted in all downlink (DL) sub-frames and are available to all UEs in the cell.

8.1.1 FDD

Figure 23:
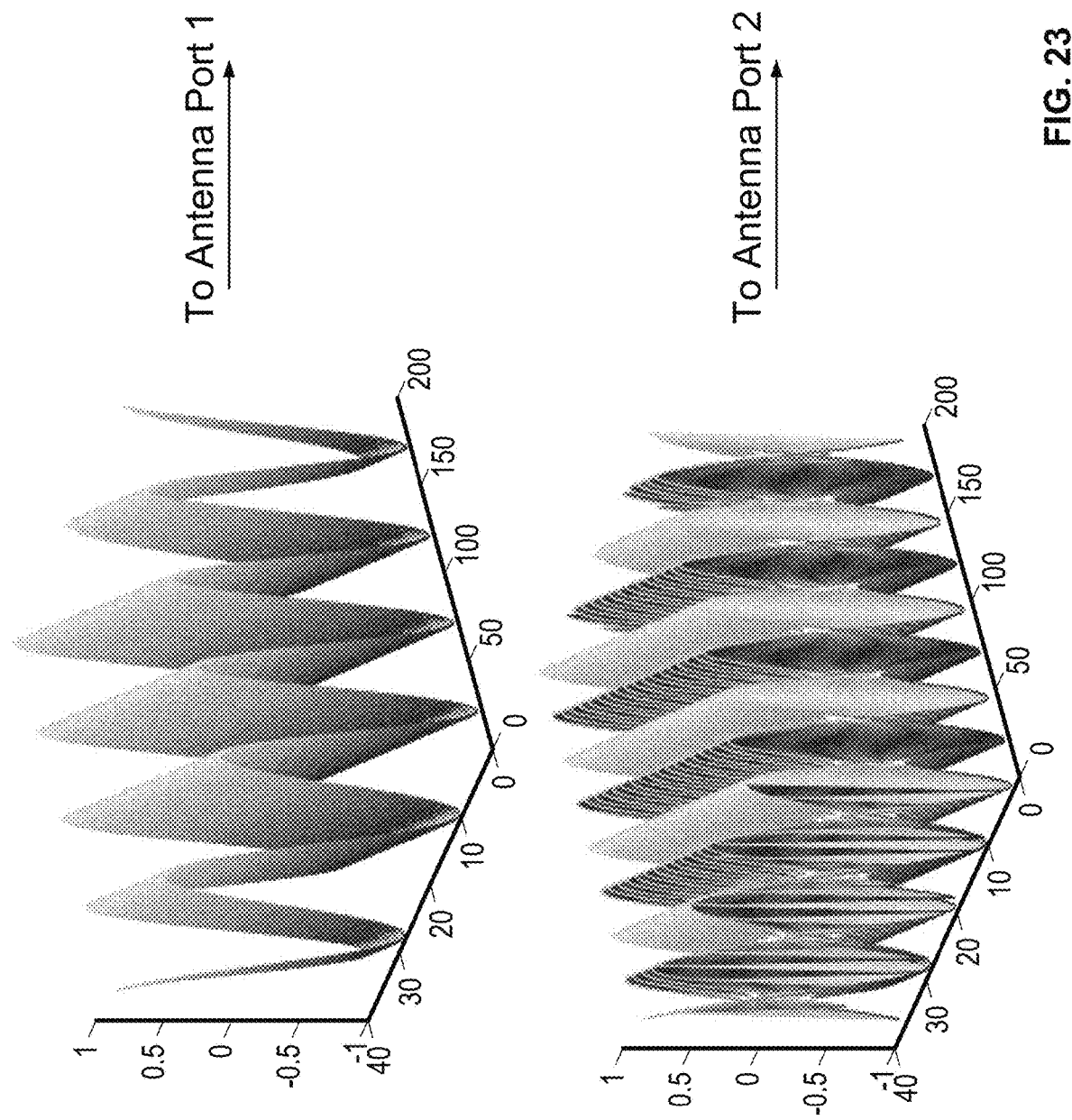
FIG. 23 shows an example of real parts of pilots P1 and P2 of FIG. 14 shown in t-f plane.

In FDD, since the DL transmissions are regular, some embodiments may use the Delay-Doppler packing with the minimal overhead which allows packing a number of pilots equal to the number of antenna ports used by the transmitting device such as the eNodeB. Some embodiments may transmit the pilots continuously (infinite lattice in the time domain). Each pilot will be transformed from the Delay-Doppler plane to the t-f plane separately and sent to its antenna port (see FIG. 23). The receiver may apply the appropriate window to get separation between the different pilots and good enough interpolation from the pilot lattice to the data lattice in the t-f plane. Transmitting the pilots continuously should not impact the data latency as the receiver can implement a sliding t-f window starting from the time it powers up, collect pilot information continuously, and be ready to estimate the channel when it needs to receive control information or data. The number of transmitted pilots and their location in the Delay-Doppler plane needs to be known to the UEs. The size and shape of the t-f window at the receiver is implementation specific and need not be specified.

8.1.2 TDD

In TDD, the regularity of the DL transmissions depends on the frame size. In LTE the shortest periodicity of DL transmissions is 5 ms (half the frame size) which, if used as the lattice points of the time domain in the t-f plane, results in a Doppler circumference of the pilot torus of 200 Hz (1/5 ms). This translates to the ability to estimate channels with a Doppler spread of no more than 200 Hz. If shorter DL periodicity is supported, larger Doppler spreads (or more pilots) can be supported using the 2-D structured reference signals.

If the regularity of the DL transmission is not fine enough to support the delay spread of the channel, one (or both) of the following other options can be used:

(1) Use reference signals if the assignment of lattice points for the reference signals supports a structure in a dimension higher than 2-D.
(2) Use 2-D non structured reference signals and restrict them to all the t-f lattice points that are available for reference signals.

8.2 UE-specific reference signals

UE-specific reference signals may only sent to specific UEs when the eNodeB transmits data to the UEs. These reference signals may be transmitted when the eNodeB uses an antenna port which is different than the cell-specific antenna ports (e.g. when the eNodeB uses a UE specific beam forming when sending data to the UE). In this case the reference signal can only be sent within the frequency band and time assigned to the UE specific transmission.

Any of the reference signals described in Section 7 can be used for the UE-specific reference signals. The type selected will depend on which t-f lattice points are available for the reference signals, as well as the frequency width and length of the transmission. As an example, a wider bandwidth transmission will enable sending multiple pilots which can be used to support multiple beams to the same UE.

The 2-D non structured reference signals could be used to send one or more pilots on the currently defined LTE UE-specific RS arrangements for any number of antenna ports.

9. EXAMPLES OF OTFS BASED UPLINK REFERENCE SIGNALS 9.1 Demodulation Reference Signals Any of the reference signals described in Section 7 can be used for the demodulation reference signals. The type selected will depend on which t-f lattice points are available for the reference signals, as well as the frequency width and length of the transmission. As an example, a wider bandwidth transmission will enable sending multiple pilots which can be used to support multiple beams.

2-D non structured reference signals could be used to send one or more pilots on the currently defined LTE demodulation RS arrangement.

9.2 Sounding Reference Signals

Sounding reference signals can be regular and hence it is proposed to use the Delay-Doppler Packing approach to maximize the number of UEs simultaneously sending pilots for a given delay spread. To minimize the length of time for estimating the channel, one could choose Latency-Sensitive Packing using the maximum size lattice interval in the frequency dimension.

Figure 24:
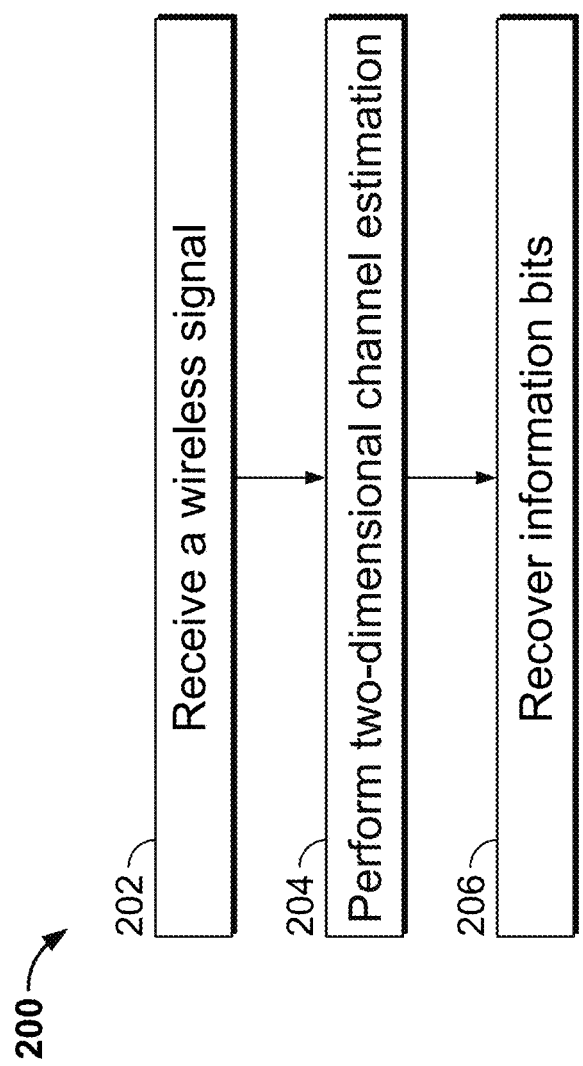
FIG. 24 shows a flowchart of an example wireless communication reception method.

FIG. 24 is a flowchart for an example method 200 of wireless communication. The method 200 may be implemented by a wireless receiver, e.g., receiver 102 depicted in FIG. 1.

The method 200 includes, at 202, receiving a wireless signal comprising a data signal portion and a pilot signal portion wherein the pilot signal portion includes multiple pilot signals multiplexed together in an orthogonal time frequency space (OTFS) domain. The data portion may include information bits, e.g., user data and/or control data.

The method 200 includes, at 204, performing two-dimensional channel estimation in a time-frequency domain based on a minimum mean square error (MMSE) optimization criterion. In some embodiments, e.g., as described in section 3, the two-dimensional channel estimation may be performed by identifying a subset of the pilot signal portion from which to obtain a preliminary channel estimate in the time-frequency domain, estimating, using samples of the wireless signal received within a two-dimensional observation window, the preliminary channel estimate, and obtaining the channel estimate by interpolating and/or predicting the preliminary channel estimate.

As further explained in Sections 3 to 6, the channel estimation may be performed using all time domain signal samples or alternatively may be performed at only a subset, e.g., at which pilot signals are received, to obtain the preliminary channel estimate, and may be followed up by channel interpolation and/or channel prediction, using the estimates from the preliminary channel estimate, to acquire entirety of a channel.

In some embodiments, an FIR Wiener filter may be used for channel estimation based on received pilot signals.

The method 200 includes, at 206, recovering information bits using a channel estimate obtained from the two-dimensional channel estimation.

Figure 25:
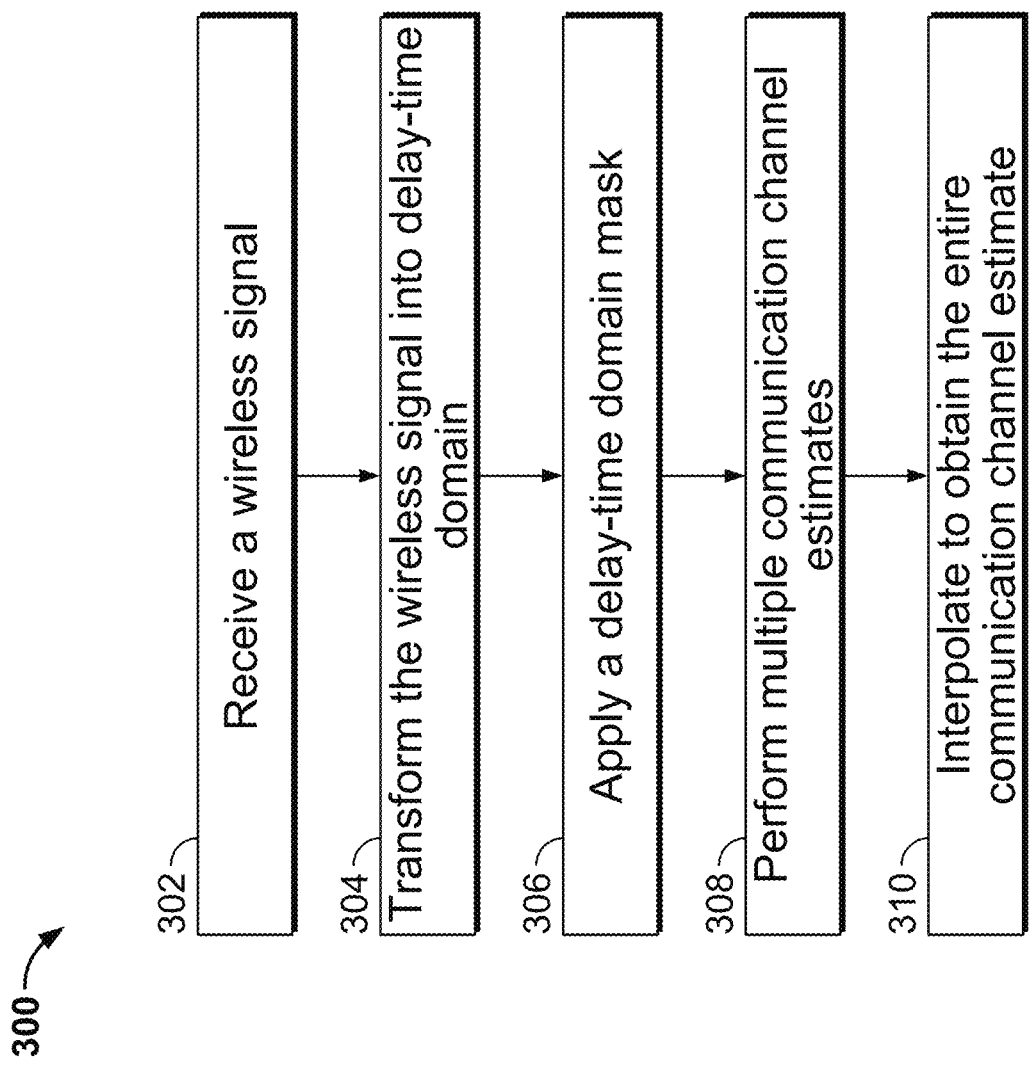
FIG. 25 shows a flowchart of another example wireless communication reception method.

FIG. 25 is a flowchart for an example method 300 of wireless communication. The method 300 may be implemented by a wireless receiver, e.g., receiver 102 depicted in FIG. 1.

The method 300 includes, at 302, receiving, over a communication channel. a wireless signal comprising a data signal portion and a pilot signal portion wherein the pilot signal portion includes multiple pilot signals multiplexed together in an orthogonal time frequency space (OTFS) domain.

The method 300 includes, at 304, transforming the received wireless signal into a delay-time domain signal. In some embodiments, the transforming is performed using Fourier transform.

The method 300 includes, at 306, applying a delay-time domain mask to separate out each of the multiple pilot signal's contribution to the delay-time domain signal into corresponding separate received pilot signal contributions. In some embodiments, a square mask that includes the value "1" for delay and time values less than their respective thresholds, and zero otherwise, may be used. Alternatively, a smoother window function may be used for the mask.

The method 300 includes, at 308, estimating, using the separate received pilot signal contributions, the communication channel estimates at delay-time domain positions of the multiple pilot signals. The estimation may be performed using one of a number of different techniques such as piecewise polynomial approximation, MMSE or frequency-limited matching approximation.

The method 300 includes, at 310, interpolating the communication channel estimates to obtain an entire communication channel estimate. The interpolation may be performed across time domain for multiple values of delays using the preliminary channel estimates obtained using a technique described herein.

Figure 26:
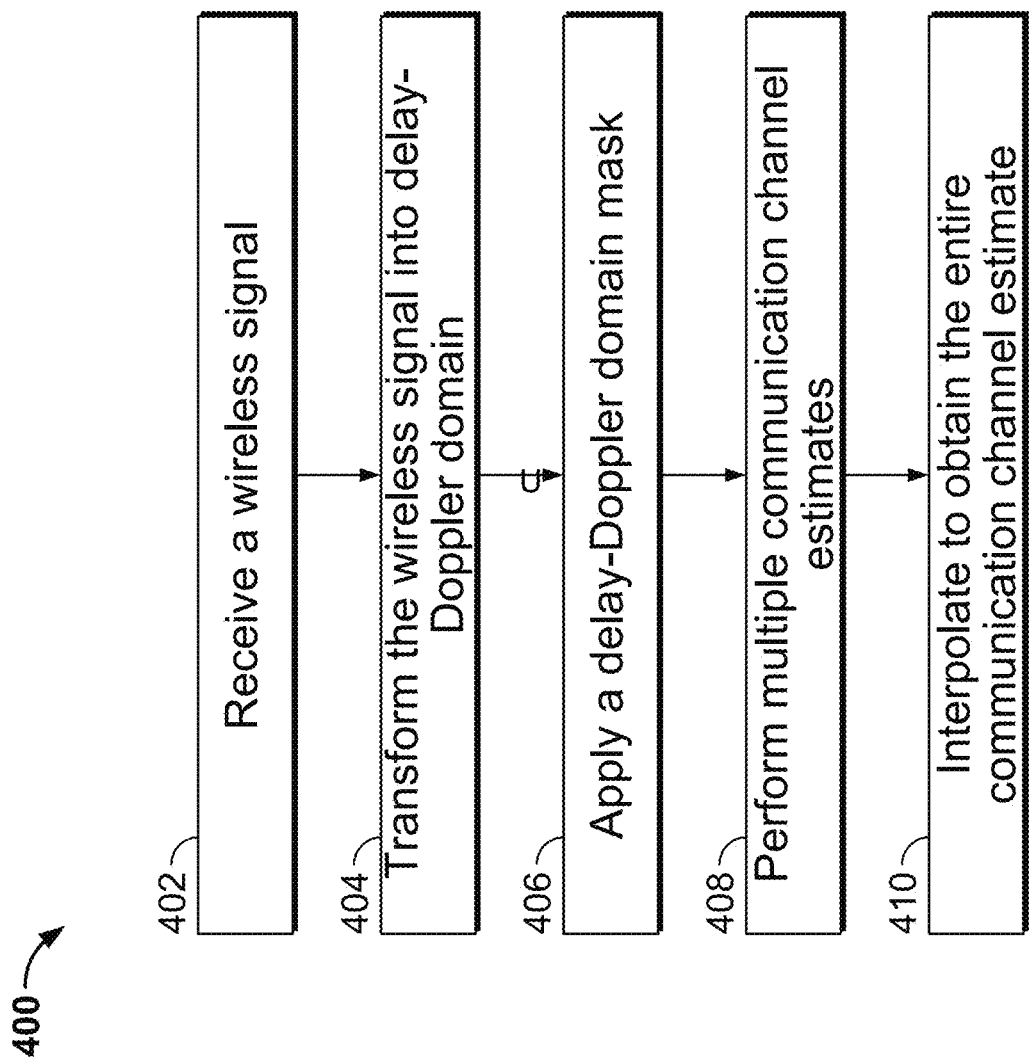
FIG. 26 shows a flowchart of another example wireless communication reception method.

FIG. 26 is a flowchart for an example method 400 of wireless communication. The method 300 may be implemented by a wireless receiver, e.g., receiver 102 depicted in FIG. 1.

The method 400 includes, at 402, receiving, over a communication channel. a wireless signal comprising a data signal portion and a pilot signal portion wherein the pilot signal portion includes multiple pilot signals multiplexed together in an orthogonal time frequency space (OTFS) domain.

The method 400 includes, at 404, transforming the received wireless signal into a delay-Doppler domain signal by applying a two-dimensional symplectic Fourier transform.

The method 400 includes, at 406, applying a delay-Doppler domain mask to separate out each of the multiple pilot signal's contribution to the time-frequency domain signal into corresponding separate received pilot signal contributions.

The method 400 includes, at 408, estimating, using the separate received pilot signal contributions, the communication channel estimates at delay-Doppler domain positions of the multiple pilot signals.

The method 400 includes, at 410, interpolating the communication channel estimates to obtain an entire communication channel estimate.

In some embodiments, a wireless communication apparatus may include a memory and a processor, wherein the memory stores instructions which, when implemented, cause the processor to implement the method 200, 300 or 400.

Additional details of method 200, 300 and 400 are also described in Section 3, 4 and 5, respectively (e.g., time-frequency domain channel acquisition, or hybrid delay-time domain channel acquisition, or delay-Doppler domain channel acquisition).

Figure 27:
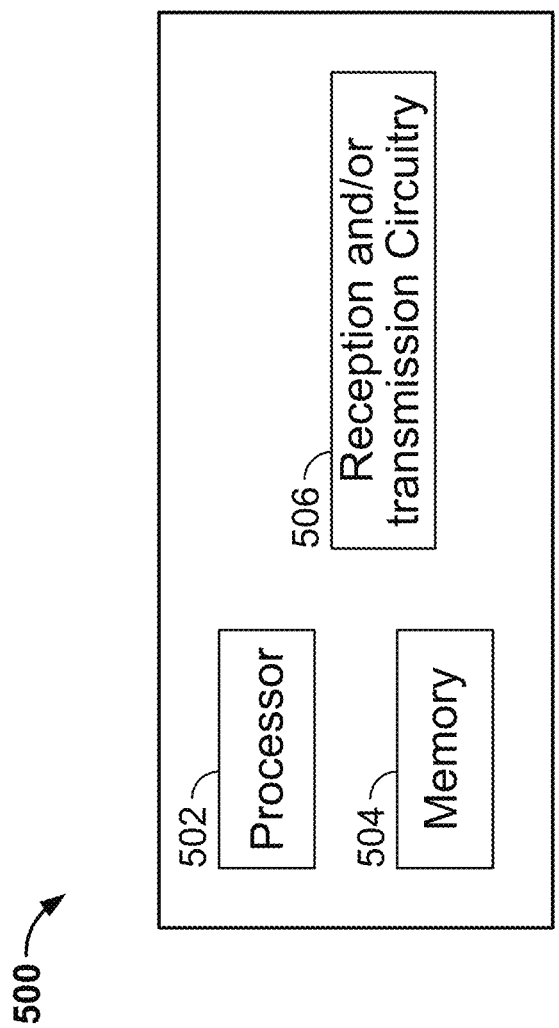
FIG. 27 shows an example of a wireless transceiver apparatus.

FIG. 27 shows an example of a wireless transceiver apparatus 500. The apparatus 500 may be used to implement method 200, 300 or 400. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

It will be appreciated that techniques for wireless data reception are disclosed by performing channel acquisition based on OTFS pilot signals.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method implemented by a transmitter of wireless signals, comprising:
    transmitting a wireless signal comprising a data signal portion and a reference signal portion multiplexed in a delay-Doppler domain, wherein the reference signal portion is sent on a first time-frequency lattice that is coarser than a second time-frequency lattice on which data portion is sent, and wherein the first time-frequency lattice is a subset of the second time-frequency lattice.

2. The method of claim 1, wherein Delay-Doppler $(\tau,\nu)$ torus associated with the first time-frequency lattice is represented as:

$$C_\tau^P = 1/(Mdf)$$
$$C_\nu^P = 1/(Ndt)$$

and wherein a Delay-Doppler torus associate with the second time-frequency lattice is represented as:

$$C_\tau^D = 1/df$$
$$C_\nu^D = 1/dt$$

where M and N are positive integers, t represents time, and f represents frequency.

3. The method of claim 1, wherein the first time-frequency lattice forms a sublattice of the second time-frequency lattice.

4. The method of claim 3, wherein the reference signal portion is generated by packing in the delay-Doppler domain, starting from a finest time-frequency pilot lattice that meets an allowed overhead.

5. The method of claim 3, wherein the reference signal portion is generated by packing in time-frequency domain, starting from a coarsest time-frequency pilot lattice that supports transmission of at least one reference signal.

6. The method of claim 1, wherein the first time-frequency lattice is a non-structured subset of the second time-frequency lattice.

7. The method of claim 1, wherein the wireless signal is transmitted in a downlink direction from a base station to user equipment.

8. The method of claim 1, wherein the wireless signal is transmitted in an uplink direction from a user equipment to a base station.

9. The method of claim 1, wherein the wireless signal is transmitted in a time division duplexing (TDD) system.

10. The method of claim 1, wherein the wireless signal is transmitted in a frequency division duplexing (FDD) system.

11. A transmitter of wireless signals, comprising one or more processors configured to cause the transmitter to implement a method comprising:
    transmitting a wireless signal comprising a data signal portion and a reference signal portion multiplexed in a delay-Doppler domain, wherein the reference signal portion is sent on a first time-frequency lattice that is coarser than a second time-frequency lattice on which data portion is sent, and wherein the first time-frequency lattice is a subset of the second time-frequency lattice.

12. The transmitter of claim 11, wherein Delay-Doppler (τ,ν) torus associated with the first time-frequency lattice is represented as:

$$C_\tau^P = 1/(Mdf)$$
$$C_\nu^P = 1/(Ndt)$$

and wherein a Delay-Doppler torus associate with the second time-frequency lattice is represented as:

$$C_\tau^D = 1/df$$
$$C_\nu^D = 1/dt$$

where M and N are positive integers, t represents time, and f represents frequency.

13. The transmitter of claim 11, wherein the first time-frequency lattice forms a sublattice of the second time-frequency lattice.

14. The transmitter of claim 13, wherein the reference signal portion is generated by packing in the delay-Doppler domain, starting from a finest time-frequency pilot lattice that meets an allowed overhead.

15. The transmitter of claim 13, wherein the reference signal portion is generated by packing in time-frequency domain, starting from a coarsest time-frequency pilot lattice that supports transmission of at least one reference signal.

16. The transmitter of claim 11, wherein the first time-frequency lattice is a non-structured subset of the second time-frequency lattice.

17. The transmitter of claim 11, wherein the transmitter is configured to transmit the wireless signal in a downlink direction from a base station to user equipment.

18. The transmitter of claim 11, wherein the transmitter is configured to transmit the wireless signal is transmitted in an uplink direction from a user equipment to a base station.

19. The transmitter of claim 11, wherein the transmitter is configured to transmit the wireless signal in a time division duplexing (TDD) system.

20. The transmitter of claim 11, wherein the transmitter is configured to transmit the wireless signal in a frequency division duplexing (FDD) system.

* * * * *